(12) United States Patent
Shibata

(10) Patent No.: US 9,191,251 B2
(45) Date of Patent: Nov. 17, 2015

(54) MULTILEVEL SIGNAL TRANSMISSION SYSTEM CAPABLE OF TRANSMITTING MULTILEVEL DATA SIGNAL WITHOUT SIGNAL DISTORTION AND CORRECTLY DETERMINING VOLTAGE LEVEL

(71) Applicant: Panasonic Corporation, Osaka (JP)

(72) Inventor: Osamu Shibata, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/499,522

(22) Filed: Sep. 29, 2014

(65) Prior Publication Data

US 2015/0049835 A1   Feb. 19, 2015

Related U.S. Application Data

(63) Continuation of application No. PCT/JP2013/001750, filed on Mar. 14, 2013.

(30) Foreign Application Priority Data

Apr. 19, 2012   (JP) ................................. 2012-095888

(51) Int. Cl.
H04L 25/49 (2006.01)
(52) U.S. Cl.
CPC ................... *H04L 25/4919* (2013.01)
(58) Field of Classification Search
USPC ......................................... 375/287, 286, 293
See application file for complete search history.

(56) References Cited

U.S. PATENT DOCUMENTS 7,042,965 B2   5/2006 Katta et al.
7,355,532 B2   4/2008 Kim
7,912,215 B2 *   3/2011 Furusawa et al. ............... 380/43

(Continued)

FOREIGN PATENT DOCUMENTS

JP   03-109842   5/1991
JP   2004-080827   3/2004
JP   2006-014327   1/2006

OTHER PUBLICATIONS

International Preliminary Report on Patentability and Written Opinion of the International Searching Authority mailed Nov. 27, 2014 in International (PCT) Patent Application No. PCT/JP2013/001750.

(Continued)

*Primary Examiner* — Eva Puente
(74) *Attorney, Agent, or Firm* — Wenderoth, Lind & Ponack, L.L.P.

(57) ABSTRACT

A multilevel signal transmitting apparatus determines a voltage level indicating an original data signal, and generates a multilevel data signal including a plurality of unit time intervals each having the determined voltage level. The multilevel signal transmitting apparatus assigns an even number of voltage levels to each unit time interval, assigns a smaller number of voltage levels than a maximum number of voltage levels, to a unit time interval next to a unit time interval to which the maximum number of voltage levels are assigned, and determines one of the assigned voltage levels, as the voltage level indicating the original data signal. A multilevel signal receiving apparatus detects the voltage level of the multilevel data signal, and reproduces the original data signal, based on the assigned voltage levels and the detected voltage level.

25 Claims, 30 Drawing Sheets

(56) References Cited

U.S. PATENT DOCUMENTS

| | | |
|---|---|---|
| 8,213,531 B2 * | 7/2012 | Kim et al. ............... 375/286 |
| 8,976,890 B2 * | 3/2015 | Ikushima et al. ......... 375/286 |
| 2004/0013214 A1 | 1/2004 | Katta et al. |
| 2005/0286642 A1 | 12/2005 | Kim |
| 2009/0041154 A1 * | 2/2009 | Kim et al. ............... 375/293 |
| 2009/0060083 A1 * | 3/2009 | Hwang et al. ........... 375/286 |
| 2015/0016562 A1 * | 1/2015 | Shibata .................. 375/286 |

OTHER PUBLICATIONS

International Search Report issued May 7, 2013 in International (PCT) Application No. PCT/JP2013/001750 with English translation.

* cited by examiner

Fig.2

| TIME | | 3t | 3t+1 | 3t+2 |
|---|---|---|---|---|
| BIT | b2 | 0 OR 1 | 0 | 0 |
| | b1 | 0 OR 1 | 0 OR 1 | 0 OR 1 |

Fig.3

| BIT | | b2 | b1 |
|---|---|---|---|
| VOLTAGE LEVEL | +1.5 | 1 | 1 |
| | +0.5 | 0 | 1 |
| | −0.5 | 0 | 0 |
| | −1.5 | 1 | 0 |

Fig.5

| TIME | BIT | |
| --- | --- | --- |
| | b2 | b1 |
| 0 | 0 | 1 |
| 1 | 0 | 0 |
| 2 | 0 | 1 |
| 3 | 0 | 0 |
| 4 | 0 | 0 |
| 5 | 0 | 1 |
| 6 | 0 | 1 |
| 7 | 0 | 0 |
| 8 | 0 | 1 |
| 9 | 1 | 1 |
| 10 | 0 | 1 |
| 11 | 0 | 1 |
| 12 | 0 | 0 |
| 13 | 0 | 0 |
| 14 | 0 | 1 |
| 15 | 0 | 1 |
| 16 | 0 | 1 |
| 17 | 0 | 0 |
| 18 | 0 | 1 |
| 19 | 0 | 0 |
| 20 | 0 | 0 |
| 21 | 0 | 0 |
| 22 | 0 | 1 |
| 23 | 0 | 1 |
| 24 | 0 | 1 |
| 25 | 0 | 0 |
| 26 | 0 | 1 |
| 27 | 1 | 0 |
| 28 | 0 | 1 |
| 29 | 0 | 0 |
| --- | --- | --- |

Fig.6

| TIME | | 4t | 4t+1 | 4t+2 | 4t+3 |
|---|---|---|---|---|---|
| BIT | b3 | 0 OR 1 | 0 | 0 | 0 |
| | b2 | 0 OR 1 | 0 OR 1 | 0 OR 1 | 0 OR 1 |
| | b1 | 0 OR 1 | 0 OR 1 | 0 OR 1 | 0 OR 1 |

Fig.7

| BIT | | b3 | b2 | b1 |
|---|---|---|---|---|
| VOLTAGE LEVEL | +3.5 | 1 | 1 | 1 |
| | +2.5 | 1 | 0 | 1 |
| | +1.5 | 0 | 1 | 1 |
| | +0.5 | 0 | 0 | 1 |
| | -0.5 | 0 | 0 | 0 |
| | -1.5 | 0 | 1 | 0 |
| | -2.5 | 1 | 0 | 0 |
| | -3.5 | 1 | 1 | 0 |

Fig.9

| TIME | BIT | | |
|---|---|---|---|
| | b3 | b2 | b1 |
| 0 | 1 | 1 | 1 |
| 1 | 0 | 1 | 1 |
| 2 | 0 | 1 | 1 |
| 3 | 0 | 0 | 0 |
| 4 | 1 | 0 | 1 |
| 5 | 0 | 1 | 1 |
| 6 | 0 | 0 | 1 |
| 7 | 0 | 1 | 1 |
| 8 | 1 | 1 | 0 |
| 9 | 0 | 0 | 1 |
| 10 | 0 | 0 | 0 |
| 11 | 0 | 0 | 0 |
| 12 | 0 | 1 | 1 |
| 13 | 0 | 1 | 1 |
| 14 | 0 | 0 | 0 |
| 15 | 0 | 1 | 1 |
| 16 | 1 | 1 | 1 |
| 17 | 0 | 0 | 0 |
| 18 | 0 | 1 | 0 |
| 19 | 0 | 0 | 0 |
| 20 | 0 | 1 | 0 |
| 21 | 0 | 0 | 1 |
| 22 | 0 | 0 | 1 |
| 23 | 0 | 0 | 0 |
| 24 | 1 | 0 | 0 |
| 25 | 0 | 1 | 1 |
| 26 | 0 | 0 | 0 |
| 27 | 0 | 1 | 1 |
| 28 | 1 | 0 | 1 |
| 29 | 0 | 0 | 1 |
| --- | --- | --- | --- |

Fig.12

| TIME | | 2t | 2t+1 |
|---|---|---|---|
| BIT | b2 | 0 OR 1 | 0 |
| | b1 | 0 OR 1 | 0 OR 1 |

Fig.14

| TIME | BIT | |
| --- | --- | --- |
| | b2 | b1 |
| 0 | 0 | 0 |
| 1 | 0 | 0 |
| 2 | 0 | 0 |
| 3 | 0 | 1 |
| 4 | 1 | 1 |
| 5 | 0 | 1 |
| 6 | 1 | 1 |
| 7 | 0 | 0 |
| 8 | 1 | 0 |
| 9 | 0 | 1 |
| 10 | 0 | 0 |
| 11 | 0 | 1 |
| 12 | 0 | 0 |
| 13 | 0 | 0 |
| 14 | 1 | 1 |
| 15 | 0 | 0 |
| 16 | 1 | 0 |
| 17 | 0 | 1 |
| 18 | 1 | 1 |
| 19 | 0 | 1 |
| 20 | 1 | 0 |
| 21 | 0 | 0 |
| 22 | 0 | 1 |
| 23 | 0 | 1 |
| 24 | 1 | 0 |
| 25 | 0 | 1 |
| 26 | 0 | 0 |
| 27 | 0 | 0 |
| 28 | 0 | 1 |
| 29 | 0 | 1 |
| --- | --- | --- |

Fig.15

| TIME | | 2t | 2t+1 |
|---|---|---|---|
| BIT | b3 | 0 OR 1 | 0 |
| | b2 | 0 OR 1 | 0 OR 1 |
| | b1 | 0 OR 1 | 0 OR 1 |

Fig.17

| TIME | BIT | | |
|---|---|---|---|
| | b3 | b2 | b1 |
| 0 | 0 | 0 | 0 |
| 1 | 0 | 0 | 0 |
| 2 | 0 | 0 | 0 |
| 3 | 0 | 0 | 1 |
| 4 | 0 | 1 | 0 |
| 5 | 0 | 0 | 1 |
| 6 | 0 | 1 | 0 |
| 7 | 0 | 1 | 0 |
| 8 | 1 | 0 | 0 |
| 9 | 0 | 0 | 0 |
| 10 | 1 | 1 | 0 |
| 11 | 0 | 1 | 1 |
| 12 | 0 | 1 | 0 |
| 13 | 0 | 1 | 0 |
| 14 | 0 | 1 | 0 |
| 15 | 0 | 1 | 0 |
| 16 | 1 | 1 | 0 |
| 17 | 0 | 0 | 1 |
| 18 | 0 | 1 | 0 |
| 19 | 0 | 1 | 1 |
| 20 | 0 | 1 | 1 |
| 21 | 0 | 0 | 1 |
| 22 | 0 | 1 | 0 |
| 23 | 0 | 0 | 0 |
| 24 | 0 | 1 | 0 |
| 25 | 0 | 0 | 0 |
| 26 | 1 | 1 | 0 |
| 27 | 0 | 0 | 0 |
| 28 | 1 | 0 | 1 |
| 29 | 0 | 0 | 1 |
| --- | --- | --- | --- |

Fig.19

| BIT | | b2 | b1 |
|---|---|---|---|
| VOLTAGE LEVEL | +1.5 | 1 | 1 |
| | +0.5 | 0 | 1 |
| | −0.5 | 0 | 0 |
| | −1.5 | 1 | 0 |

Fig.20

| BIT | | b2 | b1 |
|---|---|---|---|
| VOLTAGE LEVEL | +1 | 0 | 1 |
| | −1 | 0 | 0 |

Fig.22

| TIME | BIT | |
|---|---|---|
| | b2 | b1 |
| 0 | 1 | 1 |
| 1 | 0 | 0 |
| 2 | 1 | 1 |
| 3 | 0 | 0 |
| 4 | 0 | 1 |
| 5 | 0 | 1 |
| 6 | 1 | 0 |
| 7 | 0 | 1 |
| 8 | 0 | 1 |
| 9 | 0 | 0 |
| 10 | 1 | 1 |
| 11 | 0 | 0 |
| 12 | 0 | 0 |
| 13 | 0 | 1 |
| 14 | 1 | 0 |
| 15 | 0 | 0 |
| 16 | 1 | 1 |
| 17 | 0 | 1 |
| 18 | 1 | 1 |
| 19 | 0 | 0 |
| 20 | 0 | 0 |
| 21 | 0 | 1 |
| 22 | 1 | 0 |
| 23 | 0 | 0 |
| 24 | 1 | 1 |
| 25 | 0 | 1 |
| 26 | 0 | 1 |
| 27 | 0 | 1 |
| 28 | 0 | 1 |
| 29 | 0 | 0 |
| --- | --- | --- |

Fig.23

| TIME | | 4t | 4t+1 | 4t+2 | 4t+3 |
|---|---|---|---|---|---|
| BIT | b3 | 0 OR 1 | 0 | 0 OR 1 | 0 |
| | b2 | 0 OR 1 | 0 OR 1 | 0 OR 1 | 0 OR 1 |
| | b1 | 0 OR 1 | 0 OR 1 | 0 OR 1 | 0 OR 1 |

Fig.24

| BIT | | b3 | b2 | b1 |
|---|---|---|---|---|
| VOLTAGE LEVEL | +3.5 | 1 | 1 | 1 |
| | +2.5 | 1 | 0 | 1 |
| | +1.5 | 0 | 1 | 1 |
| | +0.5 | 0 | 0 | 1 |
| | −0.5 | 0 | 0 | 0 |
| | −1.5 | 0 | 1 | 0 |
| | −2.5 | 1 | 0 | 0 |
| | −3.5 | 1 | 1 | 0 |

Fig.25

| BIT | | b3 | b2 | b1 |
|---|---|---|---|---|
| VOLTAGE LEVEL | +2 | 0 | 1 | 1 |
| | +1 | 0 | 0 | 1 |
| | −1 | 0 | 0 | 0 |
| | −2 | 0 | 1 | 0 |

Fig.26

| BIT | | b3 | b2 | b1 |
|---|---|---|---|---|
| VOLTAGE LEVEL | +3 | 0 | 1 | 1 |
| | +1 | 0 | 0 | 1 |
| | −1 | 0 | 0 | 0 |
| | −3 | 0 | 1 | 0 |

*Fig.28*

| TIME | BIT | | |
|---|---|---|---|
| | b3 | b2 | b1 |
| 0 | 0 | 1 | 1 |
| 1 | 0 | 1 | 0 |
| 2 | 1 | 0 | 1 |
| 3 | 0 | 0 | 0 |
| 4 | 0 | 0 | 1 |
| 5 | 0 | 1 | 1 |
| 6 | 0 | 0 | 1 |
| 7 | 0 | 0 | 0 |
| 8 | 0 | 0 | 1 |
| 9 | 0 | 1 | 1 |
| 10 | 1 | 0 | 1 |
| 11 | 0 | 0 | 1 |
| 12 | 1 | 0 | 0 |
| 13 | 0 | 1 | 1 |
| 14 | 0 | 0 | 0 |
| 15 | 0 | 0 | 1 |
| 16 | 0 | 0 | 0 |
| 17 | 0 | 0 | 1 |
| 18 | 0 | 1 | 1 |
| 19 | 0 | 1 | 0 |
| 20 | 1 | 1 | 1 |
| 21 | 0 | 0 | 0 |
| 22 | 0 | 0 | 0 |
| 23 | 0 | 1 | 1 |
| 24 | 1 | 1 | 1 |
| 25 | 0 | 0 | 0 |
| 26 | 1 | 0 | 1 |
| 27 | 0 | 0 | 1 |
| 28 | 1 | 1 | 1 |
| 29 | 0 | 1 | 0 |
| --- | --- | --- | --- |

Fig.30

| TIME | BIT | |
|---|---|---|
| | b2 | b1 |
| 0 | D2_8B10B[0] | D1_8B10B[0] |
| 1 | 0 | D1_8B10B[1] |
| 2 | D2_8B10B[1] | D1_8B10B[2] |
| 3 | 0 | D1_8B10B[3] |
| 4 | D2_8B10B[2] | D1_8B10B[4] |
| 5 | 0 | D1_8B10B[5] |
| 6 | D2_8B10B[3] | D1_8B10B[6] |
| 7 | 0 | D1_8B10B[7] |
| 8 | D2_8B10B[4] | D1_8B10B[8] |
| 9 | 0 | D1_8B10B[9] |
| 10 | D2_8B10B[5] | D1_8B10B[0] |
| 11 | 0 | D1_8B10B[1] |
| 12 | D2_8B10B[6] | D1_8B10B[2] |
| 13 | 0 | D1_8B10B[3] |
| 14 | D2_8B10B[7] | D1_8B10B[4] |
| 15 | 0 | D1_8B10B[5] |
| 16 | D2_8B10B[8] | D1_8B10B[6] |
| 17 | 0 | D1_8B10B[7] |
| 18 | D2_8B10B[9] | D1_8B10B[8] |
| 19 | 0 | D1_8B10B[9] |
| 20 | D2_8B10B[0] | D1_8B10B[0] |
| 21 | 0 | D1_8B10B[1] |
| 22 | D2_8B10B[1] | D1_8B10B[2] |
| 23 | 0 | D1_8B10B[3] |
| 24 | D2_8B10B[2] | D1_8B10B[4] |
| 25 | 0 | D1_8B10B[5] |
| 26 | D2_8B10B[3] | D1_8B10B[6] |
| 27 | 0 | D1_8B10B[7] |
| 28 | D2_8B10B[4] | D1_8B10B[8] |
| 29 | 0 | D1_8B10B[9] |
| --- | --- | --- |

Fig.32

| TIME | BIT | | |
|---|---|---|---|
| | b3 | b2 | b1 |
| 0 | D3_8B10B[0] | D2_8B10B[0] | D1_8B10B[0] |
| 1 | 0 | D2_8B10B[1] | D1_8B10B[1] |
| 2 | D3_8B10B[1] | D2_8B10B[2] | D1_8B10B[2] |
| 3 | 0 | D2_8B10B[3] | D1_8B10B[3] |
| 4 | D3_8B10B[2] | D2_8B10B[4] | D1_8B10B[4] |
| 5 | 0 | D2_8B10B[5] | D1_8B10B[5] |
| 6 | D3_8B10B[3] | D2_8B10B[6] | D1_8B10B[6] |
| 7 | 0 | D2_8B10B[7] | D1_8B10B[7] |
| 8 | D3_8B10B[4] | D2_8B10B[8] | D1_8B10B[8] |
| 9 | 0 | D2_8B10B[9] | D1_8B10B[9] |
| 10 | D3_8B10B[5] | D2_8B10B[0] | D1_8B10B[0] |
| 11 | 0 | D2_8B10B[1] | D1_8B10B[1] |
| 12 | D3_8B10B[6] | D2_8B10B[2] | D1_8B10B[2] |
| 13 | 0 | D2_8B10B[3] | D1_8B10B[3] |
| 14 | D3_8B10B[7] | D2_8B10B[4] | D1_8B10B[4] |
| 15 | 0 | D2_8B10B[5] | D1_8B10B[5] |
| 16 | D3_8B10B[8] | D2_8B10B[6] | D1_8B10B[6] |
| 17 | 0 | D2_8B10B[7] | D1_8B10B[7] |
| 18 | D3_8B10B[9] | D2_8B10B[8] | D1_8B10B[8] |
| 19 | 0 | D2_8B10B[9] | D1_8B10B[9] |
| 20 | D3_8B10B[0] | D2_8B10B[0] | D1_8B10B[0] |
| 21 | 0 | D2_8B10B[1] | D1_8B10B[1] |
| 22 | D3_8B10B[1] | D2_8B10B[2] | D1_8B10B[2] |
| 23 | 0 | D2_8B10B[3] | D1_8B10B[3] |
| 24 | D3_8B10B[2] | D2_8B10B[4] | D1_8B10B[4] |
| 25 | 0 | D2_8B10B[5] | D1_8B10B[5] |
| 26 | D3_8B10B[3] | D2_8B10B[6] | D1_8B10B[6] |
| 27 | 0 | D2_8B10B[7] | D1_8B10B[7] |
| 28 | D3_8B10B[4] | D2_8B10B[8] | D1_8B10B[8] |
| 29 | 0 | D2_8B10B[9] | D1_8B10B[9] |
| --- | --- | --- | --- |

MULTILEVEL SIGNAL TRANSMISSION SYSTEM CAPABLE OF TRANSMITTING MULTILEVEL DATA SIGNAL WITHOUT SIGNAL DISTORTION AND CORRECTLY DETERMINING VOLTAGE LEVEL

CROSS-REFERENCE TO RELATED APPLICATIONS

This is a continuation application of International Application No. PCT/JP2013/001750, with an international filing date of Mar. 14, 2013, which claims priority of Japanese Patent Application No. 2012-095888 filed on Apr. 19, 2012, the content of which is incorporated herein by reference.

BACKGROUND

1. Technical Field

The present disclosure relates to a multilevel signal transmitting apparatus, a multilevel signal receiving apparatus, and a multilevel signal transmission system, for transmitting multilevel data signals with a plurality of voltage levels equal to or more than four. The present disclosure also relates to a multilevel signal transmission method using such a multilevel signal transmitting apparatus and a multilevel signal receiving apparatus.

2. Description of Related Art

In recent years, as the video quality of digital contents improves, the bit rate and size of video data increase, and as a result, the data amount to be transmitted between apparatuses also increases. In order to transmit a large amount of data between apparatuses connected through a digital interface, a frequency of signal transmission is often increased. However, if the frequency is increased, the signal transmission becomes difficult due to attenuation in a transmission line. In order to avoid this problem, there is the multilevel signal transmission scheme in which data is multiplexed by transmitting a multilevel data signal with a plurality of voltage levels equal to or more than three, without increasing a frequency of signal transmission.

For example, the inventions of Japanese Patent laid-open Publication No. H03-109842 A and Japanese Patent laid-open Publication No. 2004-080827 A are known as examples of transmission system using a multilevel signal.

SUMMARY

In the case of using a multilevel data signal with many voltage levels, there is a large transition between voltage levels in two consecutive unit time intervals of the multilevel data signal (i.e., a minimum unit time in which the multilevel data signal has a voltage level). For example, since the multilevel signal transmission system of Japanese Patent laid-open Publication No. H03-109842 A uses a multilevel data signal with four voltage levels. Therefore, if assuming that all the voltage differences between voltage levels are the same, a maximum transition between voltage levels is three times a minimum transition between voltage levels (i.e., resolution for distinguished different voltage levels). If a transition between voltage levels much larger than the resolution for distinguishing different voltage levels occurs, an overshoot or undershoot in a voltage level occurs, and thus, a signal waveform degrades (for example, an eye pattern is closed). Therefore, according to the conventional multilevel signal transmission system, there is a problem that the receiving apparatus can not correctly determine the plurality of voltage levels of the multilevel data signal received from the transmitting apparatus.

The object of the present disclosure is to solve the above problems, and to provide a multilevel signal transmitting apparatus, a multilevel signal receiving apparatus, a multilevel signal transmission system, and a multilevel signal transmission method, each capable of correctly determining a plurality of voltage levels of a multilevel data signal.

According to a multilevel signal transmitting apparatus according to one general aspect of the present disclosure, a multilevel signal transmitting apparatus for generating a multilevel data signal from an original data signal is provided. The multilevel data signal has an even number of voltage levels equal to or more than four. The multilevel signal transmitting apparatus is provided with: a data processing circuit configured to determine the voltage level indicative of the original data signal, in each of unit time intervals, and a driver circuit configured to generate the multilevel data signal including a plurality of unit time intervals, each unit time interval having the determined voltage level. The data processing circuit is configured to: assign a predetermined even number of voltage levels to each of the unit time intervals, assign a smaller number of voltage levels than a maximum number of voltage levels, to a unit time interval next to a unit time interval to which the maximum number of voltage levels are assigned, and determine one of the assigned voltage levels, as the voltage level indicative of the original data signal, in each of the unit time intervals. The driver circuit is configured to generate the multilevel data signal, such that a maximum of absolute values of the voltage levels assigned to the unit time interval, to which the smaller number of voltage levels than the maximum number of voltage levels are assigned, is smaller than a maximum of absolute values of the voltage levels assigned to the unit time interval, to which the maximum number of voltage levels are assigned.

According to a multilevel signal receiving apparatus according to another general aspect of the present disclosure, a multilevel signal receiving apparatus for receiving a multilevel data signal having an even number of voltage levels equal to or more than four is provided. In each of unit time intervals, the multilevel data signal is assigned with a predetermined even number of voltage levels. A smaller number of voltage levels than a maximum number of voltage levels are assigned to a unit time interval next to a unit time interval to which the maximum number of voltage levels are assigned. The multilevel data signal has one of the assigned voltage levels in each of the unit time intervals. A maximum of absolute values of the voltage levels assigned to the unit time interval, to which the smaller number of voltage levels than the maximum number of voltage levels are assigned, is smaller than a maximum of absolute values of the voltage levels assigned to the unit time interval, to which the maximum number of voltage levels are assigned. The multilevel signal receiving apparatus is further provided with: a receiver circuit configured to detect the voltage level of the multilevel data signal in each of the unit time intervals, and a data processing circuit configured to reproduce an original data signal of the multilevel data signal, based on the assigned voltage levels and the detected voltage level, in each of the unit time interval.

In addition, according to other aspects of the present disclosure, a multilevel signal transmission system provided with the multilevel signal transmitting apparatus and the multilevel signal receiving apparatus, and a multilevel signal transmission method are provided.

The general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to the multilevel signal transmitting apparatus, the multilevel signal receiving apparatus, the multilevel signal transmission system, and the multilevel signal transmission method of the aspects of the present disclosure, it is possible to correctly determine a plurality of voltage levels of a multilevel data signal.

BRIEF DESCRIPTION OF DRAWINGS

FIG. 2 is a table showing a first example of a bit transition rule used by a data processing circuit 101 of a multilevel signal transmitting apparatus 100 of FIG. 1.

FIG. 3 is a table showing a first example of voltage levels generated by a multilevel driver circuit 102 of the multilevel signal transmitting apparatus 100 of FIG. 1.

FIG. 5 is a table showing an example of a bit string generated by the data processing circuit 101 of the multilevel signal transmitting apparatus 100 of FIG. 1, under the conditions of FIG. 2.

FIG. 6 is a table showing a second example of a bit transition rule used by the data processing circuit 101 of the multilevel signal transmitting apparatus 100 of FIG. 1.

FIG. 7 is a table showing a second example of voltage levels generated by the multilevel driver circuit 102 of the multilevel signal transmitting apparatus 100 of FIG. 1.

FIG. 9 is a table showing an example of a bit string generated by the data processing circuit 101 of the multilevel signal transmitting apparatus 100 of FIG. 1, under the conditions of FIG. 6.

FIG. 12 is a table showing a first example of a bit transition rule used by a data processing circuit 101 of a multilevel signal transmitting apparatus 100 of FIG. 11.

FIG. 14 is a table showing an example of a bit string generated by the data processing circuit 101 of the multilevel signal transmitting apparatus 100 of FIG. 11, under the conditions of FIG. 12.

FIG. 15 is a table showing a second example of a bit transition rule used by the data processing circuit 101 of the multilevel signal transmitting apparatus 100 of FIG. 11.

FIG. 17 is a table showing an example of a bit string generated by the data processing circuit 101 of the multilevel signal transmitting apparatus 100 of FIG. 11, under the conditions of FIG. 15.

FIG. 19 is a table showing a first example of voltage levels generated by a multilevel driver circuit 102C of a multilevel signal transmitting apparatus 100C of FIG. 18, and assigned to a first unit time interval 2t.

FIG. 20 is a table showing the first example of voltage levels generated by the multilevel driver circuit 102C of the multilevel signal transmitting apparatus 100C of FIG. 18, and assigned to a second unit times period 2t+1.

FIG. 22 is a table showing an example of a bit string generated by the data processing circuit 101C of the multilevel signal transmitting apparatus 100C of FIG. 18, under the conditions of FIG. 12.

FIG. 23 is a table showing a second example of a bit transition rule used by the data processing circuit 101C of the multilevel signal transmitting apparatus 100C of FIG. 18.

FIG. 24 is a table showing a second examples of voltage levels generated by the multilevel driver circuit 102C of the multilevel signal transmitting apparatus 100C of FIG. 18, and assigned to first and third unit time intervals 4t and 4t+2.

FIG. 25 is a table showing the second examples of voltage levels generated by the multilevel driver circuit 102C of the multilevel signal transmitting apparatus 100C of FIG. 18, and assigned to a second unit times period 4t+1.

FIG. 26 is a table showing the second examples of voltage levels generated by the multilevel driver circuit 102C of the multilevel signal transmitting apparatus 100C of FIG. 18, and assigned to a fourth unit times period 4t+3.

FIG. 28 is a table showing an example of a bit string generated by the data processing circuit 101C of the multilevel signal transmitting apparatus 100C of FIG. 18, under the conditions of FIG. 23.

FIG. 30 is a table showing a first example of a bit string generated by a data processing circuit 101D of a multilevel signal transmitting apparatus 100D of FIG. 29.

FIG. 32 is a table showing a second examples of a bit string generated by the data processing circuit 101D of the multilevel signal transmitting apparatus 100D of FIG. 29.

DETAILED DESCRIPTION

Figure 1:
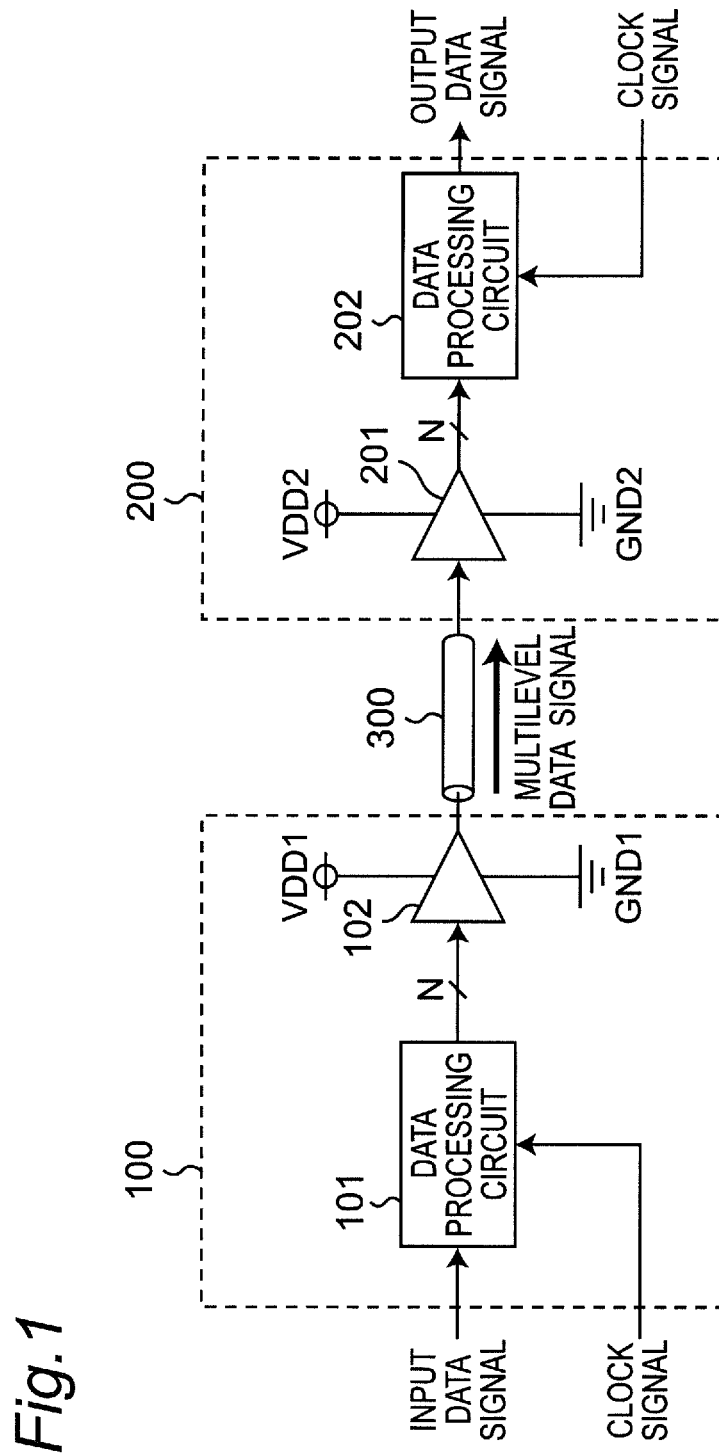
FIG. 1 is a block diagram showing a configuration of a multilevel signal transmission system according to a first embodiment.

Embodiments of the present disclosure will be described hereinafter with reference to the drawings.
In the drawings, the same reference sign indicates similar components.
First Embodiment
FIG. 1 is a block diagram showing a configuration of a multilevel signal transmission system according to a first embodiment. The multilevel signal transmission system of FIG. 1 is provided with a multilevel signal transmitting apparatus 100 and a multilevel signal receiving apparatus 200. A multilevel data signal having an even number of voltage levels equal to or more than four is transmitted from the multilevel signal transmitting apparatus 100 to the multilevel signal receiving apparatus 200 through a transmission line 300. In respective embodiments described in this specification, the multilevel data signal has a number of values, in which the number is equal to a power of two (for example, four or eight, etc.) in each of unit time intervals, and the number is expressed in N bits.

An input data signal and a clock signal at a certain frequency f [Hz] are inputted into the multilevel signal transmitting apparatus 100 from an external circuit (not shown). The multilevel signal transmitting apparatus 100 is provided with a data processing circuit 101 and a multilevel driver circuit 102, and has a power supply VDD1 and a ground GND1. The data processing circuit 101 operates based on the clock signal, determines a voltage level indicative of the input data signal in each of the unit time intervals, generates Nbit parallel data indicative of the determined voltage level, and sends it to the multilevel driver circuit 102. The multilevel driver circuit 102 generates the multilevel data signal at one of $2^N$ voltage levels, from the Nbit parallel data indicative of the input data signal, in each of the unit time intervals.

In particular, the voltage level of the multilevel data signal is determined as follows. The data processing circuit 101 assigns a predetermined number $2^N$ of voltage levels to each of the unit time intervals. However, in this case, the data processing circuit 101 assigns a smaller number of voltage levels than a maximum number of voltage levels, to a unit time interval next to a unit time interval to which the maximum number of voltage levels are assigned. The data processing circuit 101 determines one of the assigned voltage levels, as the voltage level indicative of the input data signal, in each of the unit time intervals. The multilevel driver circuit 102 generates the multilevel data signal including a plurality of unit time intervals, each unit time interval having the determined voltage level. In this case, the multilevel driver circuit 102 generates the multilevel data signal, such that a maximum of absolute values of the voltage levels assigned to the unit time interval, to which the smaller number of voltage levels than the maximum number of voltage levels are assigned, is smaller than a maximum of absolute values of the voltage levels assigned to the unit time interval, to which the maximum number of voltage levels are assigned.

The multilevel driver circuit 102 transmits the multilevel data signal to the multilevel signal receiving apparatus 200 through the transmission line 300.

A clock signal at the frequency f [Hz] is inputted into the multilevel signal receiving apparatus 200 from an external circuit (not shown). The multilevel signal receiving apparatus 200 is provided with a multilevel receiver circuit 201 and a data processing circuit 202, and has a power supply VDD2 and a ground GND2. The multilevel data signal received from the multilevel signal transmitting apparatus 100 is inputted into the multilevel receiver circuit 201, and the multilevel receiver circuit 201 detects the voltage level of the multilevel data signal in each of the unit time intervals. The multilevel receiver circuit 201 has a plurality of predetermined threshold voltages for determining the voltage levels of the multilevel data signal. Based on these threshold voltages, the multilevel receiver circuit 201 determines which of the $2^N$ voltage levels is indicated by the received multilevel data signal, in each of the unit time intervals, generates Nbit parallel data from the multilevel data signal, and sends it to the data processing circuit 202. The data processing circuit 202 operates based on the clock signal, and reproduces and outputs an output data signal corresponding to the input data signal, from the Nbit parallel data indicative of the detected voltage level. In particular, the data processing circuit 202 known in advance how the data processing circuit 101 of the multilevel signal transmitting apparatus 100 assigns a plurality of voltage levels to each of the unit time intervals. The data processing circuit v determines which of the plurality of assigned voltage levels is indicated by the detected voltage level (i.e., voltage level indicated by the Nbit parallel data), in each of the unit time intervals.

Next, as an exemplary operation of the multilevel signal transmission system of FIG. 1, the case in which the voltage levels of the multilevel data signal are indicated in N=2 bits is explained with reference to FIGS. 2 to 5. Hereinafter, a reference voltage level is shown as 0 [V] for explanation. However, an actual reference voltage level is set to a certain voltage level, e.g., between a voltage of the power supply VDD1 and a voltage of the ground GND1.

FIG. 2 shows a table indicating a first example of a bit transition rule used by the data processing circuit 101 of the multilevel signal transmitting apparatus 100 of FIG. 1. In the example of FIG. 2, times corresponding to three consecutive unit time intervals are denoted by: 3t, 3t+1, and 3t+2, respectively, where t is an integer. Assignment of bits b1 and b2 to each time (i.e., each of the unit time intervals) periodically changes as shown in FIG. 2. Both bits b1 and b2 are assigned to time 3t. Only bit b1 is assigned to each of times 3t+1 and 3t+2, with bit b2 being fixed to 0.

FIG. 3 is a table showing a first example of voltage levels generated by the multilevel driver circuit 102 of the multilevel signal transmitting apparatus 100 of FIG. 1. According to values of bits b1 and b2, the voltage level is set to one of: +1.5, +0.5, −0.5, and −1.5 [V]. In time 3t of FIG. 2, since both bits b1 and b2 are assigned, the voltage level is set to one of four values. In times 3t+1 and 3t+2 of FIG. 2, since bit b2 is always 0, the voltage level is set to one of +0.5 and −0.5 [V].

Figure 4:
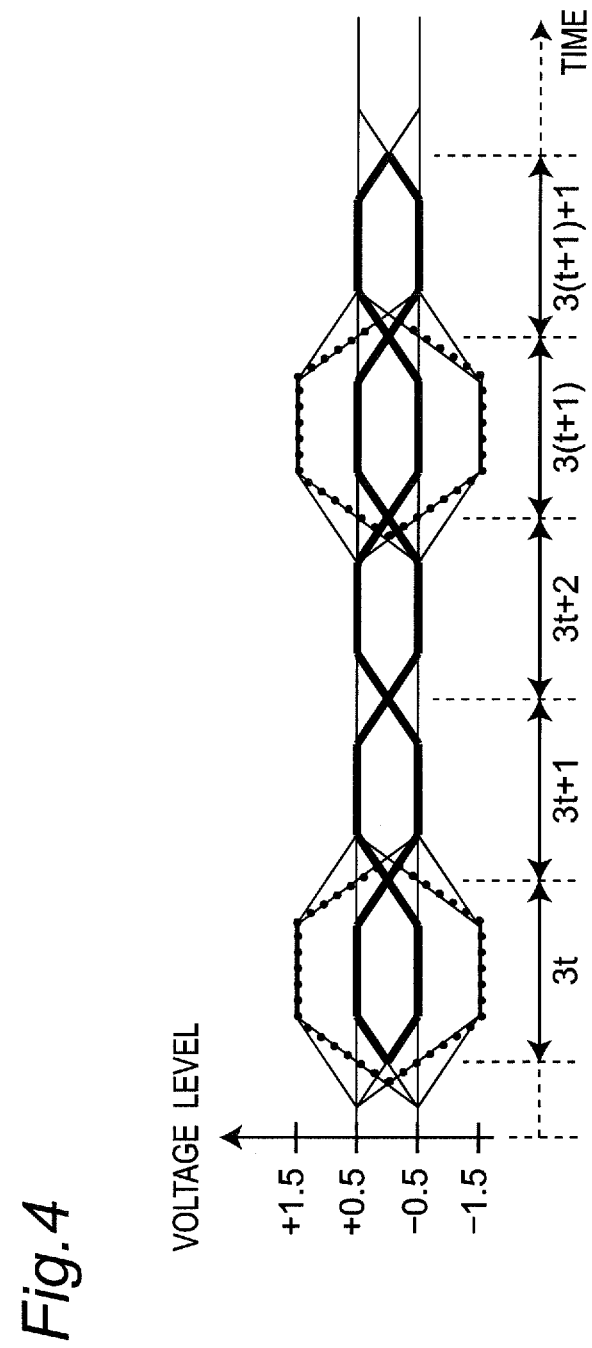
FIG. 4 is a waveform diagram showing a multilevel data signal transmitted in the multilevel signal transmission system of FIG. 1, under the conditions of FIGS. 2 and 3.

FIG. 4 is a waveform diagram showing a multilevel data signal transmitted in the multilevel signal transmission system of FIG. 1, under the conditions of FIGS. 2 and 3. The data processing circuit 101 assigns a predetermined number $2^1$ or $2^2$ of voltage levels to each of the unit time intervals, as shown in FIGS. 2 and 3. However, in this case, the data processing circuit 101 assigns a smaller number $2^1$ of voltage levels than a maximum number $2^2$ of voltage levels, to a unit time interval next to a unit time interval to which the maximum number of voltage levels are assigned. The data processing circuit 101 determines one of the assigned voltage levels, as the voltage level indicative of the input data signal, in each of the unit time intervals. In addition, the multilevel driver circuit 102 generates the multilevel data signal, such that a maximum 0.5 [V] of absolute values of the voltage levels assigned to the unit time interval, to which the smaller number $2^1$ of voltage levels than the maximum number $2^2$ of voltage levels are assigned, is smaller than a maximum 1.5 [V] of absolute values of the voltage levels assigned to the unit time interval, to which the maximum number $2^2$ of voltage levels are assigned. Thus, the multilevel data signal is generated so that consecutive unit time intervals do not have voltage levels with the maximum absolute values, i.e., +1.5 or −1.5.

FIG. 5 is a table showing an example of a bit string generated by the data processing circuit 101 of the multilevel signal transmitting apparatus 100 of FIG. 1, under the conditions of FIG. 2. When the multilevel driver circuit 102 generates the multilevel data signal according to the bit string of FIG. 5, there is no consecutive unit time intervals of the multilevel data signal having voltage levels with the maximum absolute value, i.e., +1.5 or −1.5.

If consecutive unit time intervals have voltage levels +1.5 and −1.5, a maximum transition between voltage levels (3V) is three times a minimum transition between voltage levels (1V). On the other hand, since there is no consecutive unit time intervals having voltage levels +1.5 or −1.5 in the example shown in FIGS. 2 to 5, the maximum transition between voltage levels is given as follows.

$$|+1.5V-(-0.5V)|=|-1.5V-(+0.5V)|=2V.$$

Therefore, the multilevel signal transmission system of FIG. 1 can reduce the maximum transition between voltage levels by ⅔.

Next, as another exemplary operation of the multilevel signal transmission system of FIG. 1, the case in which the voltage levels of the multilevel data signal are indicated in N=3 bits is explained with reference to FIGS. 6 to 9.

FIG. 6 is a table showing a second example of a bit transition rule used by the data processing circuit 101 of the multilevel signal transmitting apparatus 100 of FIG. 1. In the example of FIG. 6, time periods corresponding to four consecutive unit time intervals are denoted by: 4t, 4t+1, 4t+2, and 4t+3, respectively, where t is an integer. Assignment of bits b1 to b3 to each time (i.e., each of the unit time intervals) periodically changes as shown in FIG. 6. All bits b1 to b3 are assigned to time 4t. Only bits b1 and b2 are assigned to each of times 4t+1 to 4t+3, with bit b3 being fixed to 0.

FIG. 7 is a table showing a second example of voltage levels generated by the multilevel driver circuit 102 of the multilevel signal transmitting apparatus 100 of FIG. 1. According to values of bits b1 to b3, the voltage level is set to one of: +3.5, +2.5, +1.5, +0.5, −0.5, −1.5, −2.5, and −3.5 [V]. In time 4t of FIG. 6, since all bits b1 to b3 are assigned, the voltage level is set to one of eight values. In times 4t+1 to 4t+3 of FIG. 6, since bit b3 is always 0, the voltage level is set to one of: +1.5, +0.5, −0.5, and −1.5 [V].

Figure 8:
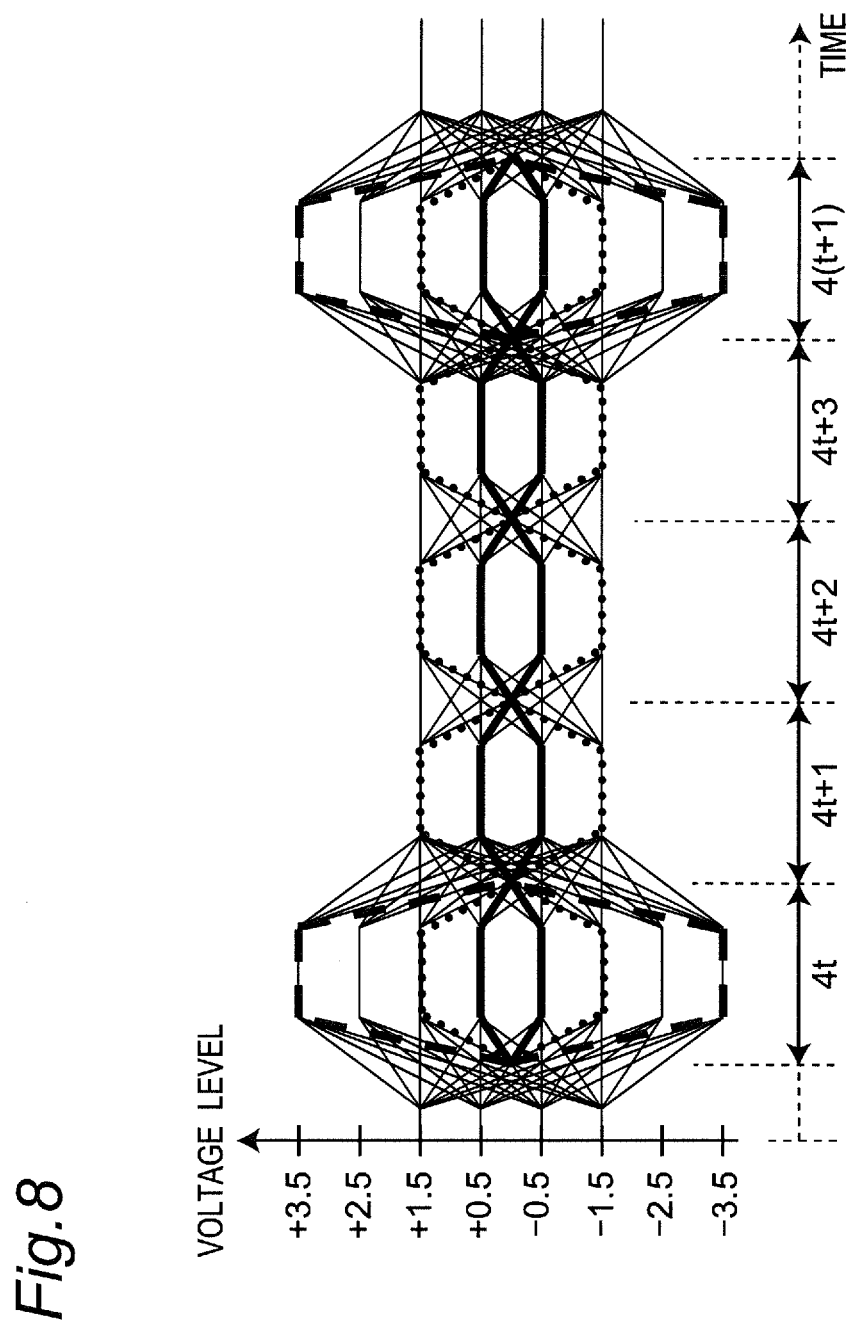
FIG. 8 is a waveform diagram showing a multilevel data signal transmitted in the multilevel signal transmission system of FIG. 1, under the conditions of FIGS. 6 and 7.

FIG. 8 is a waveform diagram showing a multilevel data signal transmitted in the multilevel signal transmission system of FIG. 1, under the conditions of FIGS. 6 and 7. The data processing circuit 101 assigns a predetermined number $2^2$ or $2^3$ of voltage levels to each of the unit time intervals, as shown in FIGS. 6 and 7. However, in this case, the data processing circuit 101 assigns a smaller number $2^2$ of voltage levels than a maximum number $2^3$ of voltage levels, to a unit time interval next to a unit time interval to which the maximum number of voltage levels are assigned. The data processing circuit 101 determines one of the assigned voltage levels, as the voltage level indicative of the input data signal, in each of the unit time intervals. In addition, the multilevel driver circuit 102 generates the multilevel data signal, such that a maximum 1.5 [V] of absolute values of the voltage levels assigned to the unit time interval, to which the smaller number $2^2$ of voltage levels than the maximum number $2^3$ of voltage levels are assigned, is smaller than a maximum 3.5 [V] of absolute values of the voltage levels assigned to the unit time interval, to which the maximum number $2^3$ of voltage levels are assigned. Thus, the multilevel data signal is generated so that consecutive unit time intervals do not have voltage levels with the maximum absolute values, i.e., +3.5 or −1.5.

FIG. 9 is a table showing an example of a bit string generated by the data processing circuit 101 of the multilevel signal transmitting apparatus 100 of FIG. 1, under the conditions of FIG. 6. When the multilevel driver circuit 102 generates the multilevel data signal according to the bit string of FIG. 6, there is no consecutive unit time intervals of the multilevel data signal having voltage levels with the maximum absolute value, i.e., +3.5 or −3.5.

If consecutive unit time intervals have voltage levels +3.5 and −3.5, a maximum transition between voltage levels (7V) is seven times a minimum transition between voltage levels (1V). On the other hand, since there is no consecutive unit time intervals having voltage levels +3.5 or −3.5 in the example shown in FIGS. 6 to 9, the maximum transition between voltage levels is given as follows.

$$|+3.5V-(-1.5V)|=|-3.5V-(+1.5V)|=5V.$$

Therefore, the multilevel signal transmission system of FIG. 1 can reduce the maximum transition between voltage levels by ⁵⁄₇.

As described above, according to the multilevel signal transmission system of FIG. 1, the data processing circuit 101 assigns a smaller number of voltage levels than a maximum number of voltage levels, to a unit time interval next to a unit time interval to which the maximum number of voltage levels are assigned, and the multilevel driver circuit 102 generates the multilevel data signal, such that a maximum of absolute values of the voltage levels assigned to the unit time interval, to which the smaller number of voltage levels than the maximum number of voltage levels are assigned, is smaller than a maximum of absolute values of the voltage levels assigned to the unit time interval, to which the maximum number of voltage levels are assigned. Thus, according to the multilevel signal transmission system of FIG. 1, it is possible to prevent overshoot and undershoot, which may cause signal distortion, by reducing an amount of transition of the voltage level. The multilevel signal transmission system of FIG. 1 can correctly determine the voltage level of the multilevel data signal, and surely transmit the multilevel data signal.

In addition, the multilevel signal transmission system of FIG. 1 can process the input data signal bit by bit, by assigning bits according to the transition rule of FIG. 2 or 6.

In addition, according to the multilevel signal transmission system of FIG. 1, it is possible to alleviate a problem that voltage differences between voltage levels are relatively reduced due to multiplexing of data in voltage, in the case of transmitting a multilevel data signal having, in particular, four or eight values, etc.

According to the multilevel signal transmission system as described above, it is assumed to use the multilevel data signal with the 2N voltage levels advantageous to easy data processing. However, the multilevel signal transmission system is not limited thereto, and it is possible to implement any multilevel signal transmission system using a multilevel data signal with an even number of voltage levels equal to or more than four.

Second Embodiment

Figure 10:
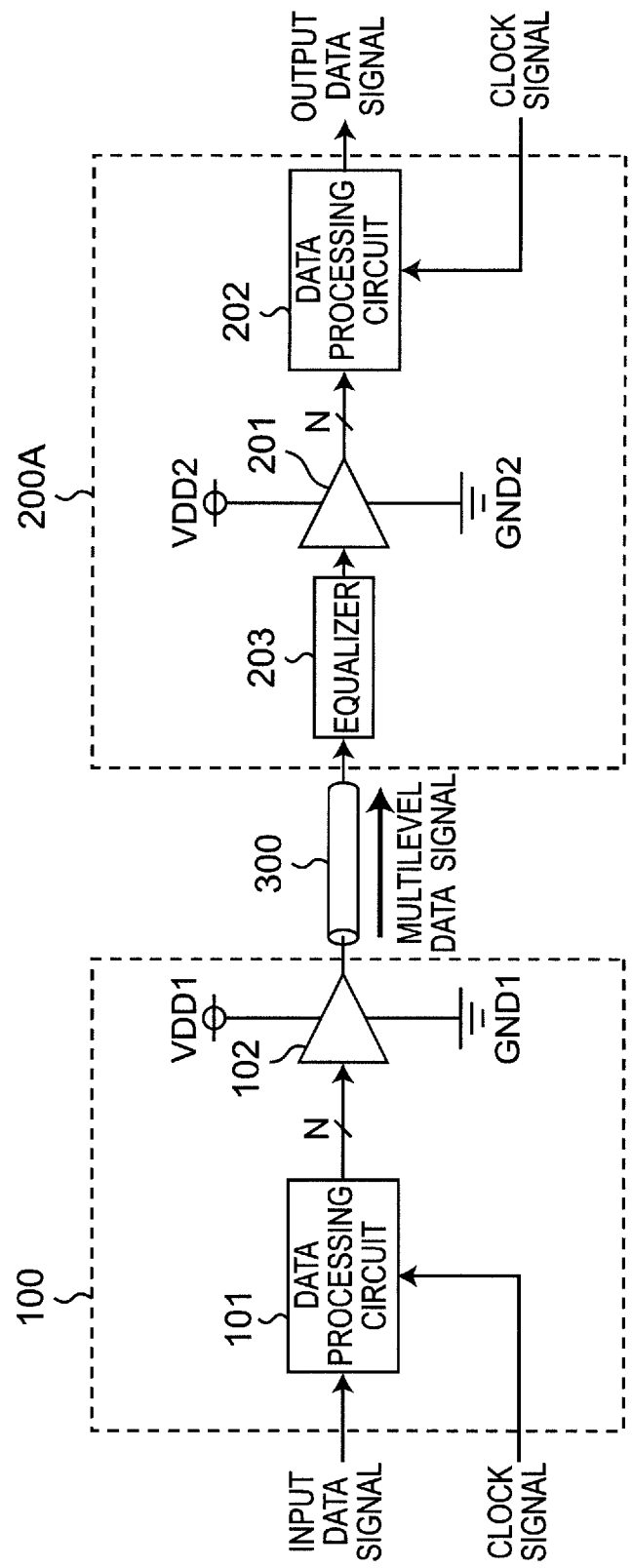
FIG. 10 is a block diagram showing a configuration of a multilevel signal transmission system according to a second embodiment.

FIG. 10 is a block diagram showing a configuration of a multilevel signal transmission system according to a second embodiment. A multilevel signal receiving apparatus 200A of FIG. 10 is configured in a manner similar to that of FIG. 1, and further provided with an equalizer 203 configured to equalize the received multilevel data signal, in front of the multilevel receiver circuit 201. In order to compensate the difference in attenuation of the multilevel data signal depending on a frequency, the equalizer 203 uses a predetermined training signal transmitted from the multilevel signal transmitting apparatus 100, and equalizes the multilevel data signal based on the bit error rate of the training signal, etc. The multilevel signal transmission system of FIG. 10 can more accurately determine the plurality of voltage levels of the multilevel data signal by using the equalizer 203.

Third Embodiment

Figure 11:
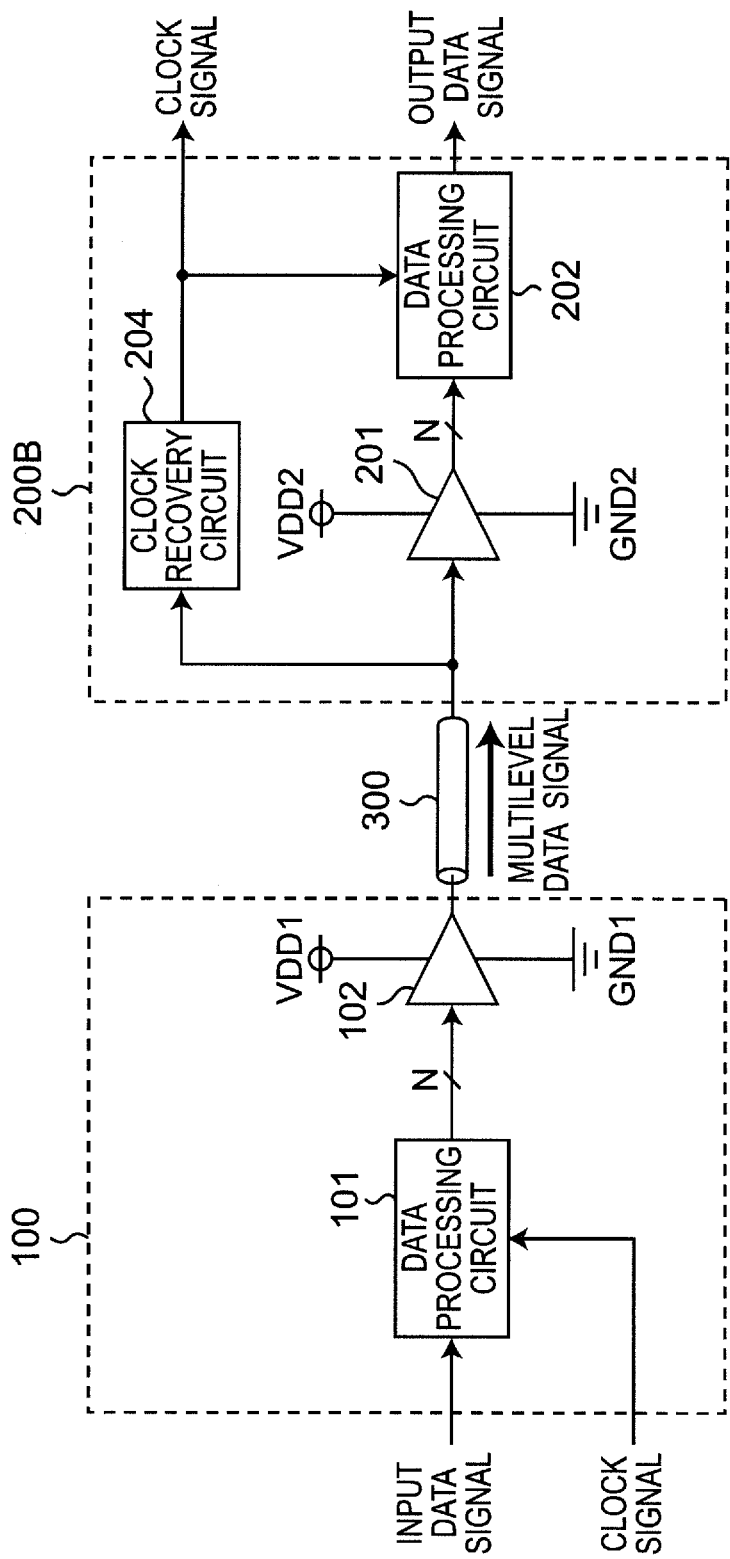
FIG. 11 is a block diagram showing a configuration of a multilevel signal transmission system according to a third embodiment.

FIG. 11 is a block diagram showing a configuration of a multilevel signal transmission system according to a third embodiment. A multilevel signal receiving apparatus 200B of FIG. 11 is configured in a manner similar to that of FIG. 1, and further provided with a clock recovery circuit 204 and recovers a clock signal from the received multilevel data signal.

The data processing circuit 101 of the multilevel signal transmitting apparatus 100 assigns different even numbers of voltage levels to any two consecutive unit time intervals, respectively. The clock recovery circuit 204 of the multilevel signal receiving apparatus 200B recovers the clock signal based on variations of the voltage level over a plurality of unit time intervals of the multilevel data signal. According to the multilevel signal transmission system of FIG. 11, when changing the number of the assigned voltage levels for every unit time interval, there is a higher possibility that the voltage level of the multilevel data signal varies for every unit time interval, and thus, it is possible to easily achieve recovery of the clock signal.

Figure 13:
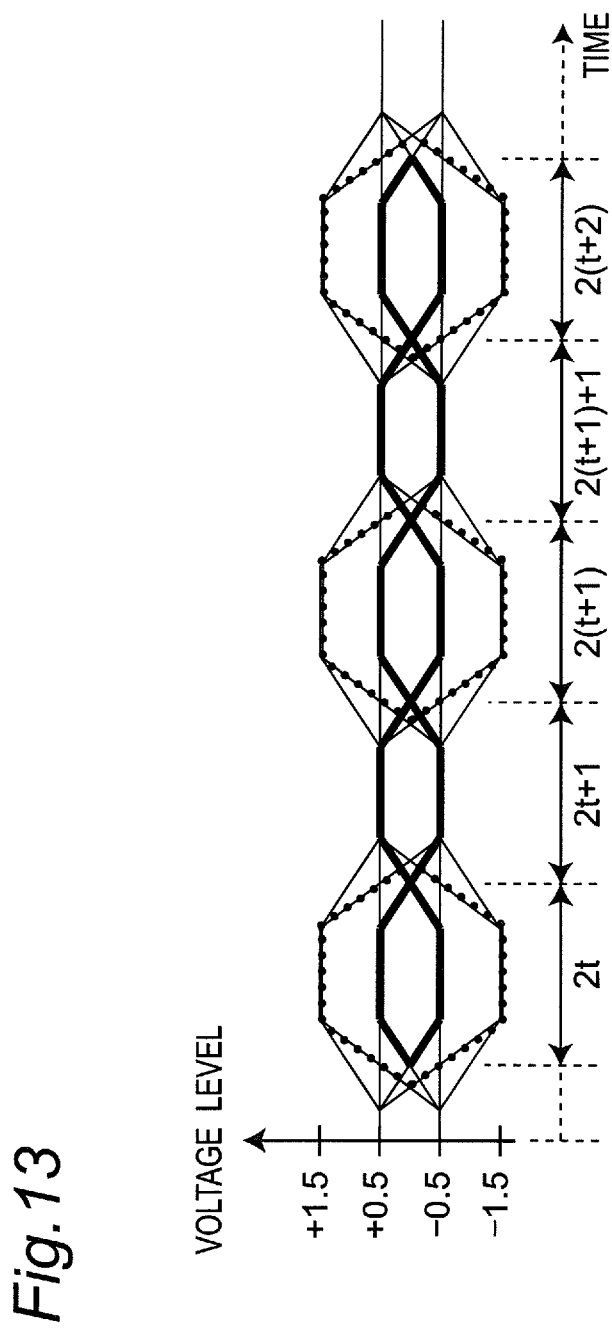
FIG. 13 is a waveform diagram showing a multilevel data signal transmitted in the multilevel signal transmission system of FIG. 11, under the conditions of FIGS. 3 and 12.

Next, as an exemplary operation of the multilevel signal transmission system of FIG. 11, the case in which the voltage levels of the multilevel data signal are indicated in N=2 bits is explained with reference to FIGS. 12 to 14.

Figure 12:
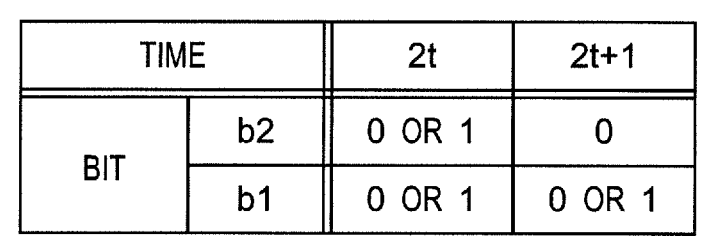

FIG. 12 is a table showing a first example of a bit transition rule used by the data processing circuit 101 of the multilevel signal transmitting apparatus 100 of FIG. 11. It is assumed that the multilevel driver circuit 102 of multilevel signal transmitting apparatus 100 of FIG. 11 generates the same voltage levels as those of FIG. 3. FIG. 13 is a waveform diagram showing a multilevel data signal transmitted in the multilevel signal transmission system of FIG. 11, under the conditions of FIGS. 3 and 12. When alternatively assigning two voltage levels and four voltage levels to the respective unit time intervals as shown in FIG. 13, there is a higher possibility that the voltage level of the multilevel data signal varies for every unit time interval, and thus, it is possible to easily achieve recovery of the clock signal.

FIG. 14 is a table showing an example of a bit string generated by the data processing circuit 101 of the multilevel signal transmitting apparatus 100 of FIG. 11, under the conditions of FIG. 12. When the multilevel driver circuit 102 generates the multilevel data signal according to the bit string of FIG. 14, there are no consecutive unit time intervals of the multilevel data signal having voltage levels with the maximum absolute value, i.e., +1.5 or −1.5, and it is possible to easily achieve recovery of the clock signal.

If consecutive unit time intervals have voltage levels +1.5 and −1.5, a maximum transition between voltage levels (3V) is three times a minimum transition between voltage levels (1V). On the other hand, in the example shown in FIGS. 12 to 14, a maximum transition between voltage levels is 2V. Therefore, the multilevel signal transmission system of FIG. 11 can reduce the maximum transition between voltage levels by ⅔.

Figure 16:
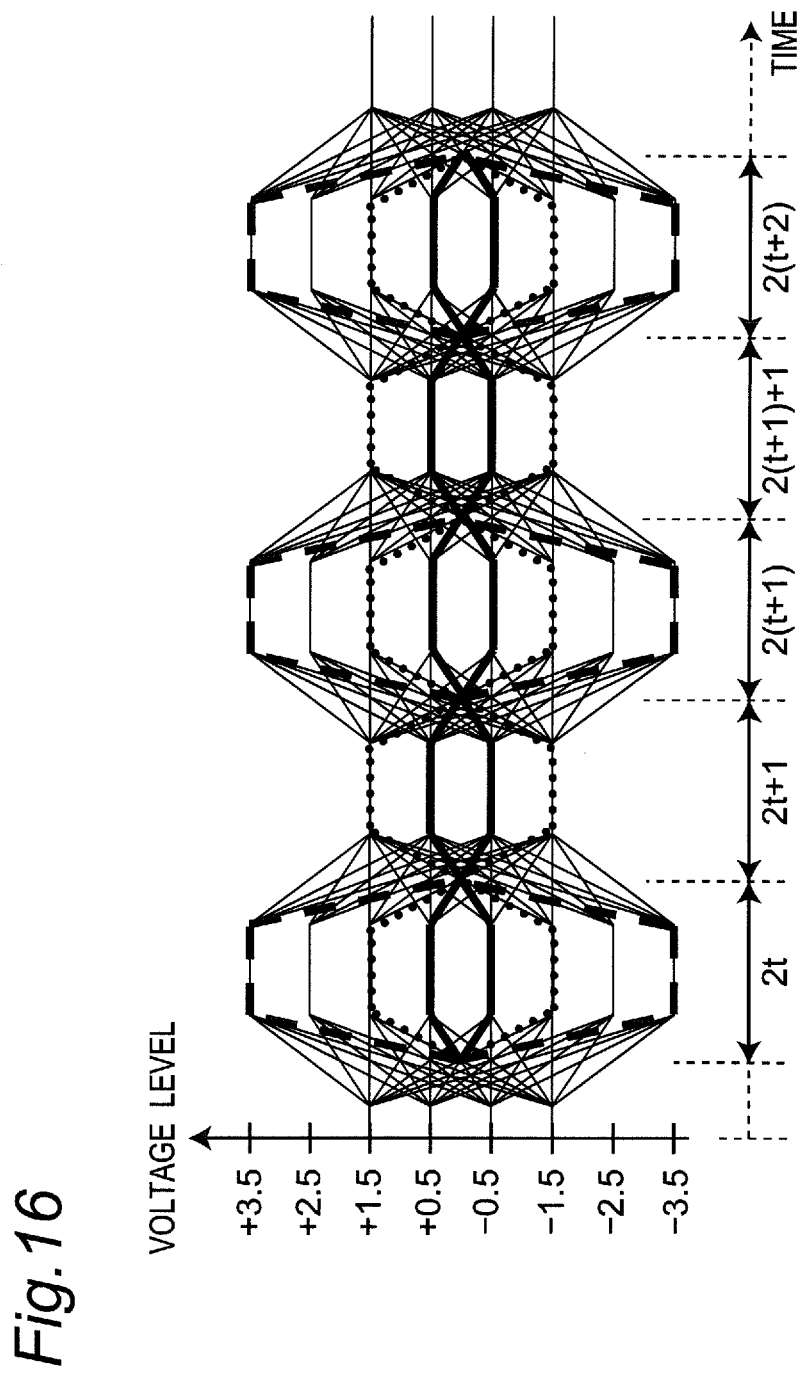
FIG. 16 is a waveform diagram showing a multilevel data signal transmitted in the multilevel signal transmission system of FIG. 11, under the conditions of FIGS. 7 and 15.

Next, as another exemplary operation of the multilevel signal transmission system of FIG. 11, the case in which the voltage levels of the multilevel data signal are indicated in N=3 bits is explained with reference to FIGS. 15 to 17.

FIG. 15 is a table showing a second example of a bit transition rule used by the data processing circuit 101 of the multilevel signal transmitting apparatus 100 of FIG. 11. It is assumed that the multilevel driver circuit 102 of multilevel signal transmitting apparatus 100 of FIG. 11 generates the same voltage levels as those of FIG. 7. FIG. 16 is a waveform diagram showing a multilevel data signal transmitted in the multilevel signal transmission system of FIG. 11, under the conditions of FIGS. 7 and 15. When alternatively assigning four voltage levels and eight voltage levels to the respective unit time intervals as shown in FIG. 16, there is a higher possibility that the voltage level of the multilevel data signal varies for every unit time interval, and thus, it is possible to easily achieve recovery of the clock signal.

FIG. 17 is a table showing an example of a bit string generated by the data processing circuit 101 of the multilevel signal transmitting apparatus 100 of FIG. 11, under the conditions of FIG. 15. When the multilevel driver circuit 102 generates the multilevel data signal according to the bit string of FIG. 17, there are no consecutive unit time intervals of the multilevel data signal having voltage levels with the maximum absolute value, i.e., +3.5 or −3.5, and it is possible to easily achieve recovery of the clock signal.

If consecutive unit time intervals have voltage levels +3.5 and −3.5, a maximum transition between voltage levels (7V) is seven times a minimum transition between voltage levels (1V). On the other hand, in the example shown in FIGS. 15 to 17, a maximum transition between voltage levels is 5V. Therefore, the multilevel signal transmission system of FIG. 11 can reduce the maximum transition between voltage levels by 5/7.

When a plurality of multilevel data signals are transmitted through a plurality of channels, that is, when there are a plurality of multilevel signal transmitting apparatus and a plurality of multilevel signal receiving apparatus, which are connected through the separate transmission lines, respectively, only one multilevel signal receiving apparatus may be provided with a clock recovery circuit, and a clock signal recovered by the clock recovery circuit may be shared by the plurality of multilevel signal receiving apparatus.

As described above, according to the multilevel signal transmission system of FIG. 11, It is possible to prevent overshoot and undershoot, which may cause signal distortion, by reducing an amount of transition of the voltage level, while easily and surely achieving recovery of the clock signal. The multilevel signal transmission system of FIG. 11 can correctly determine the voltage level of the multilevel data signal, and surely transmit the multilevel data signal.

Fourth Embodiment

Figure 18:
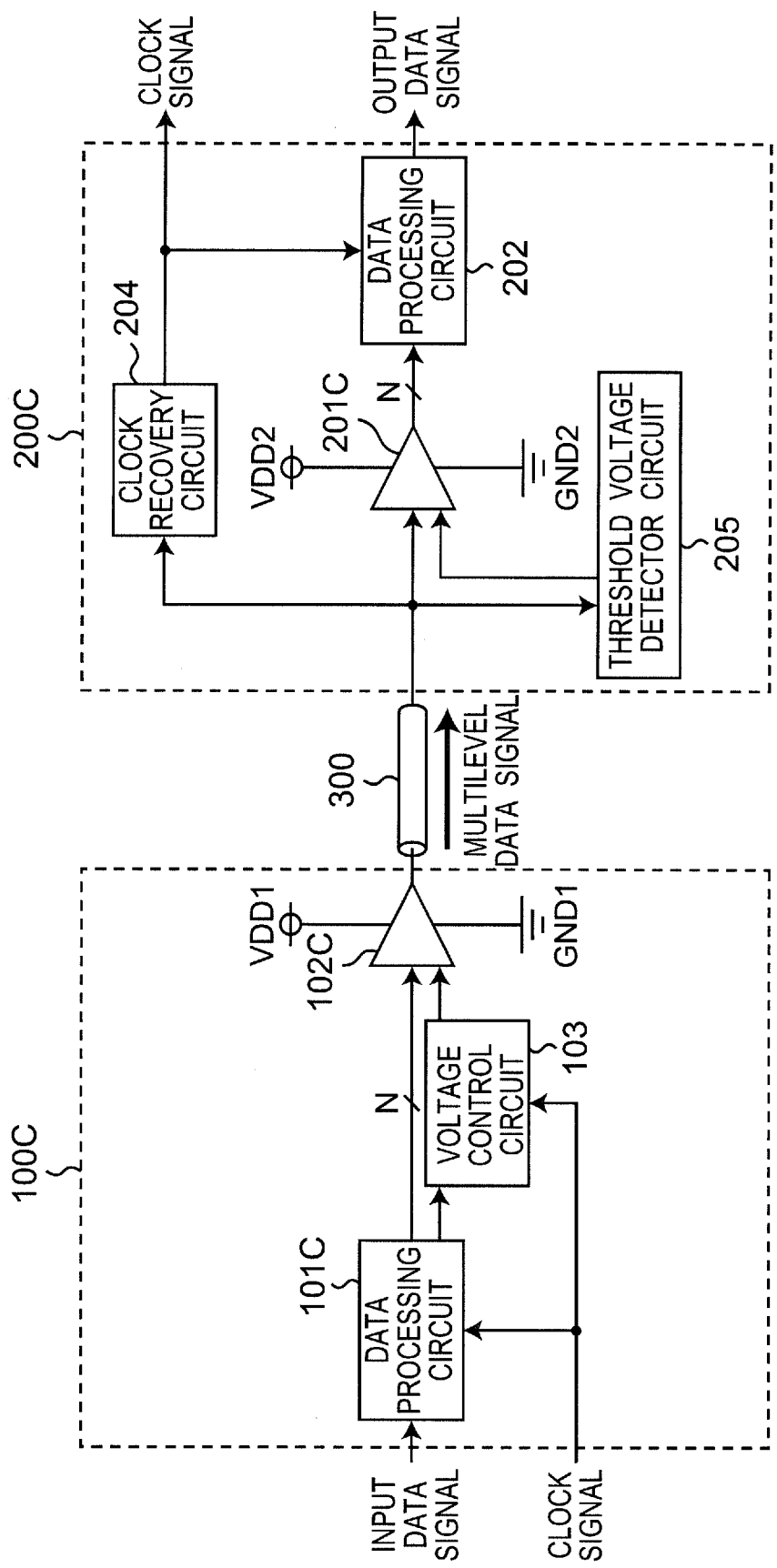
FIG. 18 is a block diagram showing a configuration of a multilevel signal transmission system according to a fourth embodiment.

FIG. 18 is a block diagram showing a configuration of a multilevel signal transmission system according to a fourth embodiment. The multilevel signal transmission system of FIG. 18 transmits a plurality of threshold voltages for determining the voltage level of the transmitted multilevel data signal, from a multilevel signal transmitting apparatus 100C to a multilevel signal receiving apparatus 200C, using the multilevel data signal itself.

The multilevel signal transmitting apparatus 100C is further provided with a voltage control circuit 103 configured to controls a voltage level of a multilevel data signal generated by a multilevel driver circuit 102C, such that between at least a pair of adjacent voltage levels of the voltage levels assigned to one of any two consecutive unit time intervals, one of the voltage levels assigned to the other of the two consecutive unit time intervals is set. The data processing circuit 101C determines the voltage level indicative of the input data signal in a manner similar to that of the data processing circuit 101 of FIG. 11, and in addition, notifies the voltage control circuit 103 of voltage levels assigned to each of the unit time intervals. The multilevel driver circuit 102C generates a multilevel data signal in a manner similar to that of the multilevel driver circuit 102 of FIG. 11, while changing voltage levels under control of the voltage control circuit 103.

The multilevel signal receiving apparatus 200C is further provided with a threshold voltage detector circuit 205 configured to detect and store the voltage levels assigned to one of any two consecutive unit time intervals of the multilevel data signal. The detected and stored voltage levels are to be used as threshold voltages to determine the voltage level assigned to the other of the two consecutive unit time intervals. In addition, the threshold voltage detector circuit 205 detects and stores an average (center level) of the voltage level of the multilevel data signal for a predetermined time. The detected and stored average is also to be used as a threshold voltage. Based on the threshold voltages detected by the threshold voltage detector circuit 205, a multilevel receiver circuit 201C determines which of the assigned voltage levels the multilevel data signal has.

Next, as an exemplary operation of the multilevel signal transmission system of FIG. 18, the case in which the voltage levels of the multilevel data signal are indicated in N=2 bits is explained with reference to FIGS. 19 to 22.

Figure 21:
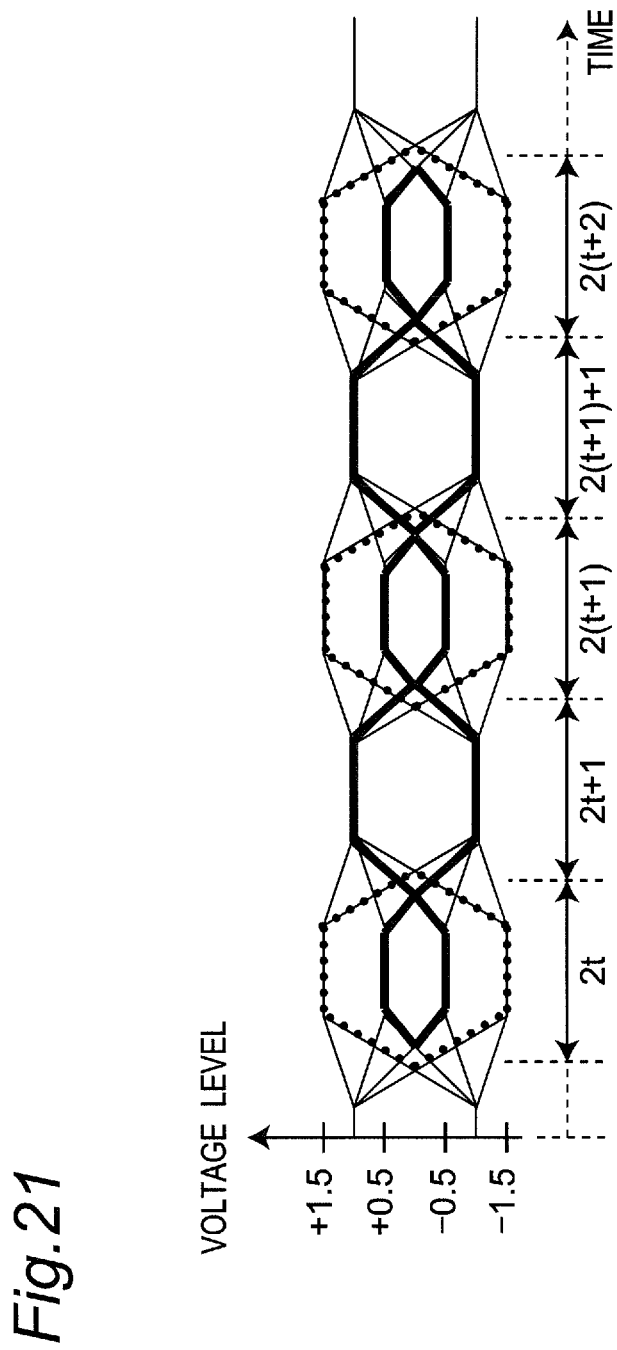
FIG. 21 is a waveform diagram showing a multilevel data signal transmitted in the multilevel signal transmission system of FIG. 18, under the conditions of FIGS. 12, 19, and 20.

It is assumed that in the data processing circuit 101C of the multilevel signal the transmitting apparatus 100C of FIG. 18 uses the same bit transition rule as that of FIG. 12. FIG. 19 is a table showing a first example of voltage levels generated by the multilevel driver circuit 102C of the multilevel signal transmitting apparatus 100C of FIG. 18, and assigned to a first unit time interval 2t. FIG. 20 is a table showing the first example of voltage levels generated by the multilevel driver circuit 102C of the multilevel signal transmitting apparatus 100C of FIG. 18, and assigned to a second unit times period 2t+1. FIG. 21 is a waveform diagram showing a multilevel data signal transmitted in the multilevel signal transmission system of FIG. 18, under the conditions of FIGS. 12, 19, and 20. The voltage levels assigned to the unit time interval 2t+1 are threshold voltages for the voltage levels assigned to the unit time interval 2t. On the other hand, the voltage levels assigned to the unit time interval 2t are threshold voltages for the voltage levels assigned to the unit time interval 2t+1. Therefore, by generating the multilevel data signal with one of the voltage levels of FIG. 19, or with one of the voltage levels of FIG. 20, in each of the unit time intervals, it is possible to transmit the threshold voltages from the multilevel signal transmitting apparatus 100C to the multilevel signal receiving apparatus 200C using the multilevel data signal itself. The threshold voltages used by the multilevel receiver circuit 201C of the multilevel signal receiving apparatus 200C include the voltage levels shown in FIGS. 19 and 20, and further include 0V. The threshold voltage of 0V is obtained by detecting the average of the voltage level of the multilevel data signal received by the multilevel signal receiving apparatus 200C. The threshold voltage detector circuit 205 continues to receive the multilevel data signal for a certain time, until it obtains all the voltage levels. The threshold voltage detector circuit 205 stores the obtained voltage levels in its internal memory (not shown).

FIG. 22 is a table showing an example of a bit string generated by the data processing circuit 101C of the multilevel signal transmitting apparatus 100C of FIG. 18, under the conditions of FIG. 12. When the multilevel driver circuit 102C generates the multilevel data signal according to the bit string of FIG. 22, consecutive unit time intervals of the multilevel data signal do not have voltage levels with the maximum absolute values, i.e., +1.5 or −1.5, and it is possible to transmit the threshold voltages from the multilevel signal transmitting apparatus 100C to the multilevel signal receiving apparatus 200C using the multilevel data signal itself.

Next, as another exemplary operation of the multilevel signal transmission system of FIG. 18, the case in which the voltage levels of the multilevel data signal are indicated in N=3 bits is explained with reference to FIGS. 23 to 28.

Figure 27:
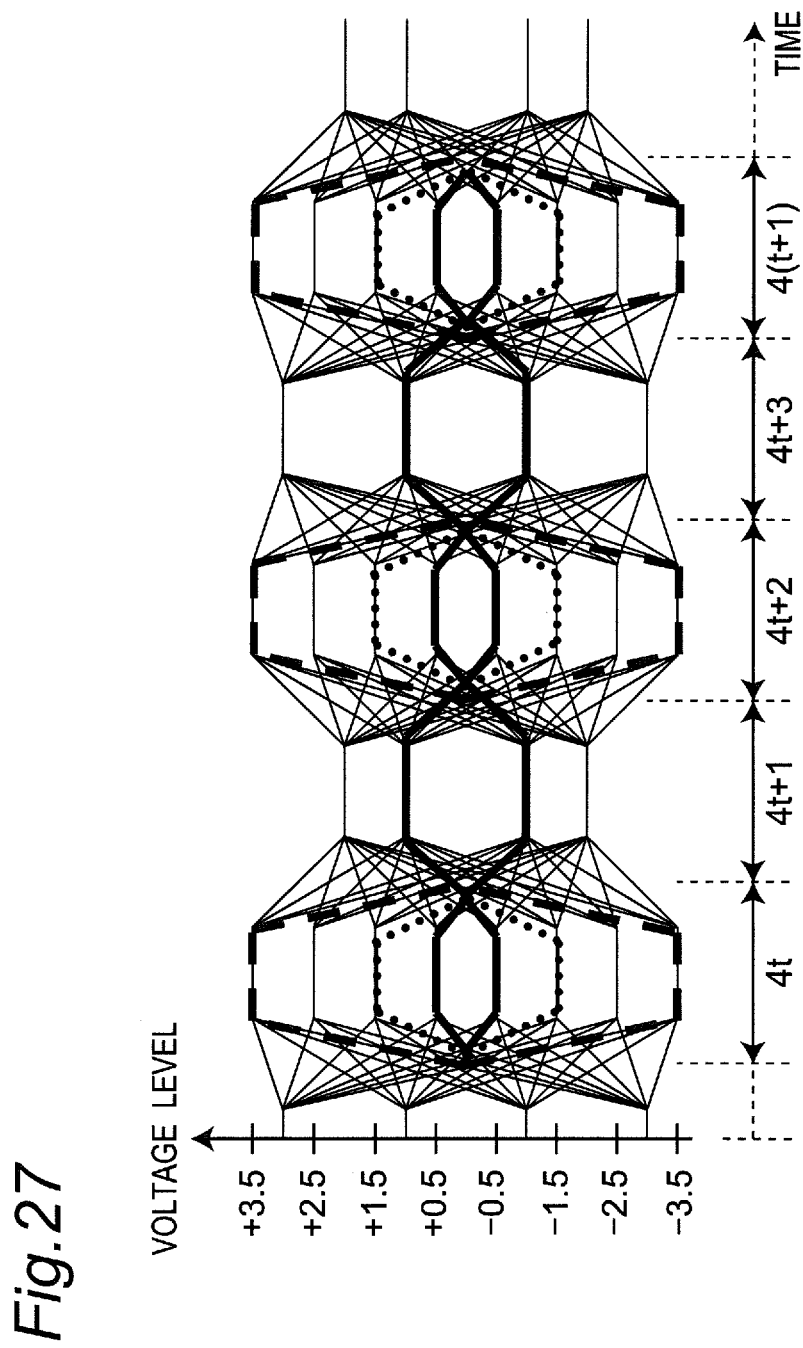
FIG. 27 is a waveform diagram showing a multilevel data signal transmitted in the multilevel signal transmission system of FIG. 18, under the conditions of FIGS. 23 to 26.

FIG. 23 is a table showing a second example of a bit transition rule used by the data processing circuit 101C of the multilevel signal transmitting apparatus 100C of FIG. 18. FIG. 24 is a table showing a second examples of voltage levels generated by the multilevel driver circuit 102C of the multilevel signal transmitting apparatus 100C of FIG. 18, and assigned to first and third unit time intervals 4t and 4t+2. FIG. 25 is a table showing the second examples of voltage levels generated by the multilevel driver circuit 102C of the multilevel signal transmitting apparatus 100C of FIG. 18, and assigned to a second unit times period 4t+1. FIG. 26 is a table showing the second examples of voltage levels generated by the multilevel driver circuit 102C of the multilevel signal transmitting apparatus 100C of FIG. 18, and assigned to a fourth unit times period 4t+3. FIG. 27 is a waveform diagram showing a multilevel data signal transmitted in the multilevel signal transmission system of FIG. 18, under the conditions of FIGS. 23 to 26. The voltage levels assigned to the unit time intervals 4t+1 and 4t+3 are threshold voltages for the voltage levels assigned to the unit time intervals 4t and 4t+2. On the other hand, the voltage levels assigned to the unit time intervals 4t and 4t+2 are threshold voltages for the voltage levels assigned to the unit time intervals 4t+1 and 4t+3. Therefore, by generating the multilevel data signal with one of the voltage levels of FIG. 24, with one of the voltage levels of FIG. 25, or with one of the voltage levels of FIG. 26, in each of the unit time intervals, it is possible to transmit the threshold voltages from the multilevel signal transmitting apparatus 100C to the multilevel signal receiving apparatus 200C using the multilevel data signal itself. The threshold voltage of 0V is obtained by detecting the average of the voltage level of the multilevel data signal received by the multilevel signal receiving apparatus 200C.

FIG. 28 is a table showing an example of a bit string generated by the data processing circuit 101C of the multilevel signal transmitting apparatus 100C of FIG. 18, under the conditions of FIG. 23. When the multilevel driver circuit 102C generates the multilevel data signal according to the bit string of FIG. 28, consecutive unit time intervals of the multilevel data signal do not have voltage levels with the maximum absolute values, i.e., +3.5 or −3.5, and it is possible to transmit the threshold voltages from the multilevel signal transmitting apparatus 100C to the multilevel signal receiving apparatus 200C using the multilevel data signal itself.

According to the multilevel signal transmission system of FIG. 18, it is possible to prevent overshoot and undershoot, which may cause signal distortion, by reducing an amount of transition of the voltage level. In addition, according to the multilevel signal transmission system of FIG. 18, since the threshold voltages are transmitted from the multilevel signal transmitting apparatus 100C to the multilevel signal receiving apparatus 200C using the multilevel data signal itself, no equalizer as provided in the multilevel signal receiving apparatus 200A of FIG. 10 is needed. According to the multilevel signal transmission system of FIG. 18, the multilevel signal transmission system is not affected by a difference between the threshold voltages used by the transmitting apparatus and the threshold voltages used by the receiving apparatus, and by a difference between the ground voltage of the transmitting apparatus and the ground voltage of the receiving apparatus, and in addition, it is possible to accurately follow variations in the voltage levels arose from a temperature change, a device variation, attenuation in a transmission line, etc. Therefore, it is possible to accurately determine the plurality of voltage levels of the multilevel data signal, and surely transmit the multilevel data signal.

The clock recovery circuit 204 of FIG. 18 may be omitted.

Fifth Embodiment

Figure 29:
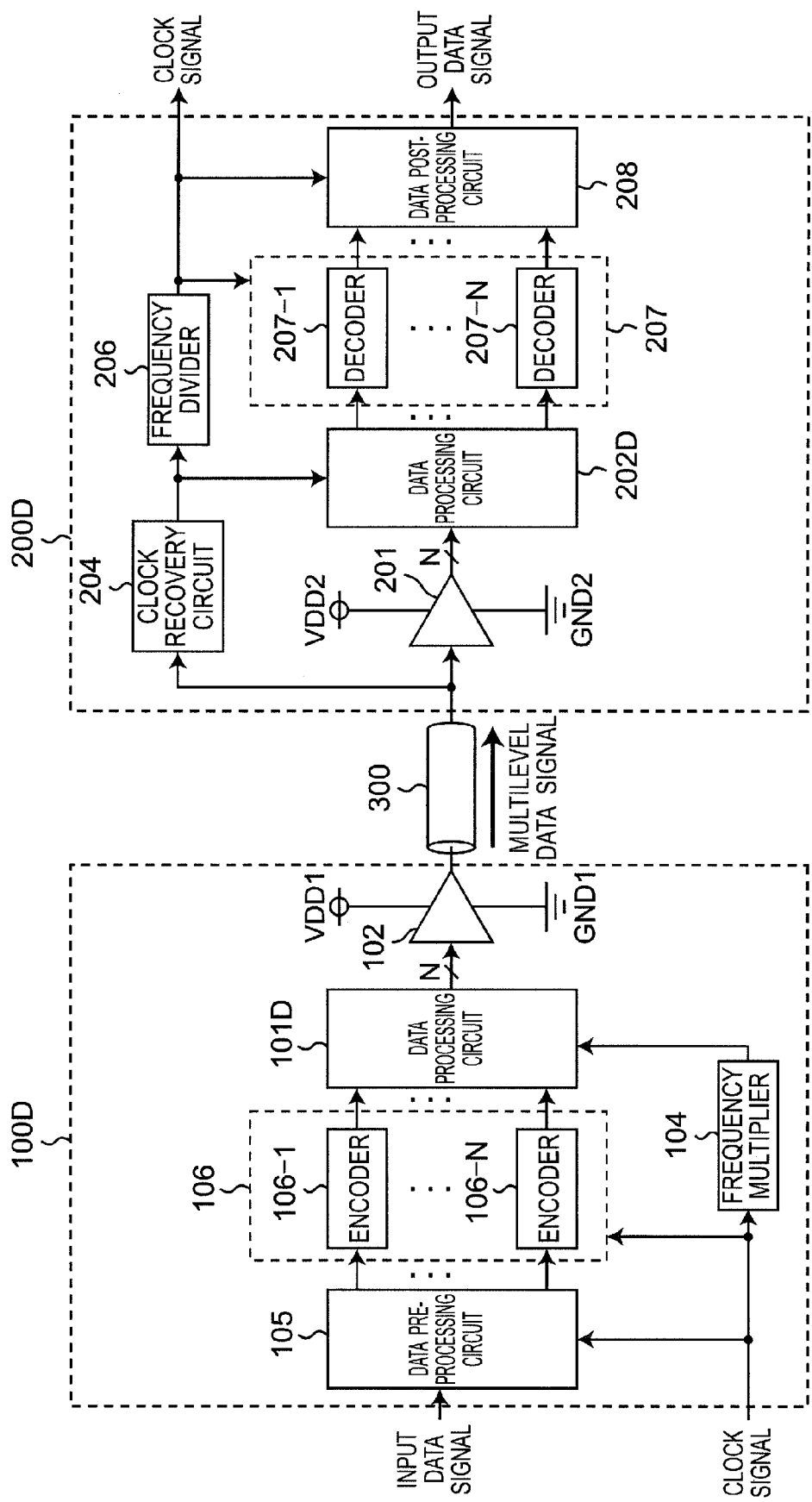
FIG. 29 is a block diagram showing a configuration of a multilevel signal transmission system according to a fifth embodiment.

FIG. 29 is a block diagram showing a configuration of a multilevel signal transmission system according to a fifth embodiment. The multilevel signal transmission system of FIG. 29 uses an encoding method with guaranteed DC balance, for example, a 8B/10B code.

A multilevel signal transmitting apparatus 100D of FIG. 29 is provided with a data preprocessing circuit 105, an encoding circuit 106, and a data processing circuit 101D, instead of the data processing circuit 101 of FIG. 11. The encoding circuit 106 includes a number N of encoders 106-1 to 106-N. The multilevel signal transmitting apparatus 100D is further provided with a frequency multiplier 104 configured to multiply the frequency of the clock signal by ten. The data preprocessing circuit 105 operates based on the clock signal, and divides the input data signal into a number N of bit strings, where 2N denotes a maximum number of the voltage levels of the multilevel data signal. The encoders 106-1 to 106-N operate based on the clock signal, and encode the respective bit strings using the 8B/10B code. In particular, each of the encoders 106-1 to 106-N converts consecutive 8 bits included in a corresponding bit string, into 10 bits, using a predetermined translation table. The data processing circuit 101D operates based on a clock signal with a multiplied frequency, decrease a rate of at least one of the bit strings to be encoded, lower than a rate of another bit string, and determine one of the number 2N of voltage levels, as the voltage level indicative of the input data signal, based on a group consisting of respective bits included in the respective bit strings, in each of the unit time intervals. Since the data processing circuit 101D decreases the rate of at least one bit string than the rate of another bit string, a smaller number of voltage levels than a maximum number of voltage levels are assigned to a unit time interval next to a unit time interval to which the maximum number of voltage levels are assigned, in a manner similar to that of the multilevel signal transmission system of FIG. 1.

A multilevel signal receiving apparatus 200D of FIG. 29 is provided with a data processing circuit 202D, a decoding circuit 207, and a data postprocessing circuit 208, instead of the data processing circuit 202 of FIG. 11. The decoding circuit 207 includes a number N of decoders 207-1 to 207-N. The multilevel signal receiving apparatus 200D is provided with a frequency divider 206 configured to divide a frequency of a clock signal recovered by the clock recovery circuit (i.e., the clock signal with the frequency multiplied by the frequency multiplier 104), by ten. The data processing circuit 202D operates based on the clock signal with the multiplied frequency (i.e., the clock signal with the frequency before dividing by the frequency divider 206), divide the multilevel data signal into a number N of bits in each of the unit time intervals, generate the number N of bit strings, each of the bit strings including one of the number N of divided bits. The decoders 207-1 to 207-N operate based on the clock signal with the divided frequency, and decode the respective bit strings using the 8B/10B code. In particular, each of the decoders 207-1 to 207-N converts consecutive 10 bits included in a corresponding bit string, into 8 bits, using a predetermined translation table. The data postprocessing circuit 208 operates based on the clock signal with the divided frequency, combines the decoded bit string, and reproduces an output data signal corresponding to the input data signal.

Figure 31:
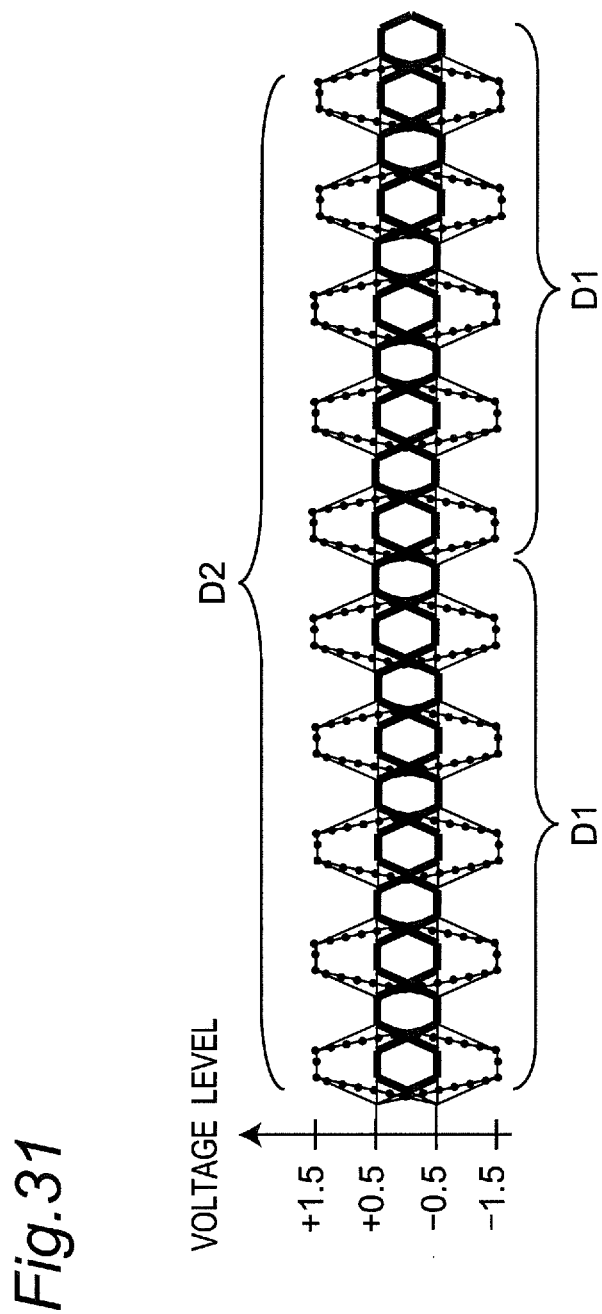
FIG. 31 is a waveform diagram showing a multilevel data signal transmitted in the multilevel signal transmission system of FIG. 29, under the conditions of FIGS. 3, 12, and 30.

Next, as an exemplary operation of the multilevel signal transmission system of FIG. 29, the case in which the voltage levels of the multilevel data signal are indicated in N=2 bits is explained with reference to FIGS. 30 and 31.

It is assumed that in the data processing circuit 101D of the multilevel signal the transmitting apparatus 100D of FIG. 29 uses the same bit transition rule as that of FIG. 12. It is assumed that the multilevel driver circuit 102 of the multilevel signal transmitting apparatus 100D of FIG. 29 generates the same voltage levels as those of FIG. 3. FIG. 30 is a table showing a first example of a bit string generated by the data processing circuit 101D of the multilevel signal transmitting apparatus 100D of FIG. 29. FIG. 31 is a waveform diagram showing a multilevel data signal transmitted in the multilevel signal transmission system of FIG. 29, under the conditions of FIGS. 3, 12, and 30. D1 and D2 denote data of the respective bit strings divided by the data preprocessing circuit 105. The bit strings of the data D1 and D2 (including bits b1 and b2, respectively) are encoded using the 8B/10B code with guaranteed DC balance, respectively. The data processing circuit 101D decreases the rate of the bit string of the data D2, lower than the rate of the bit string of the data D1, by one half, as shown in FIG. 30.

Figure 33:
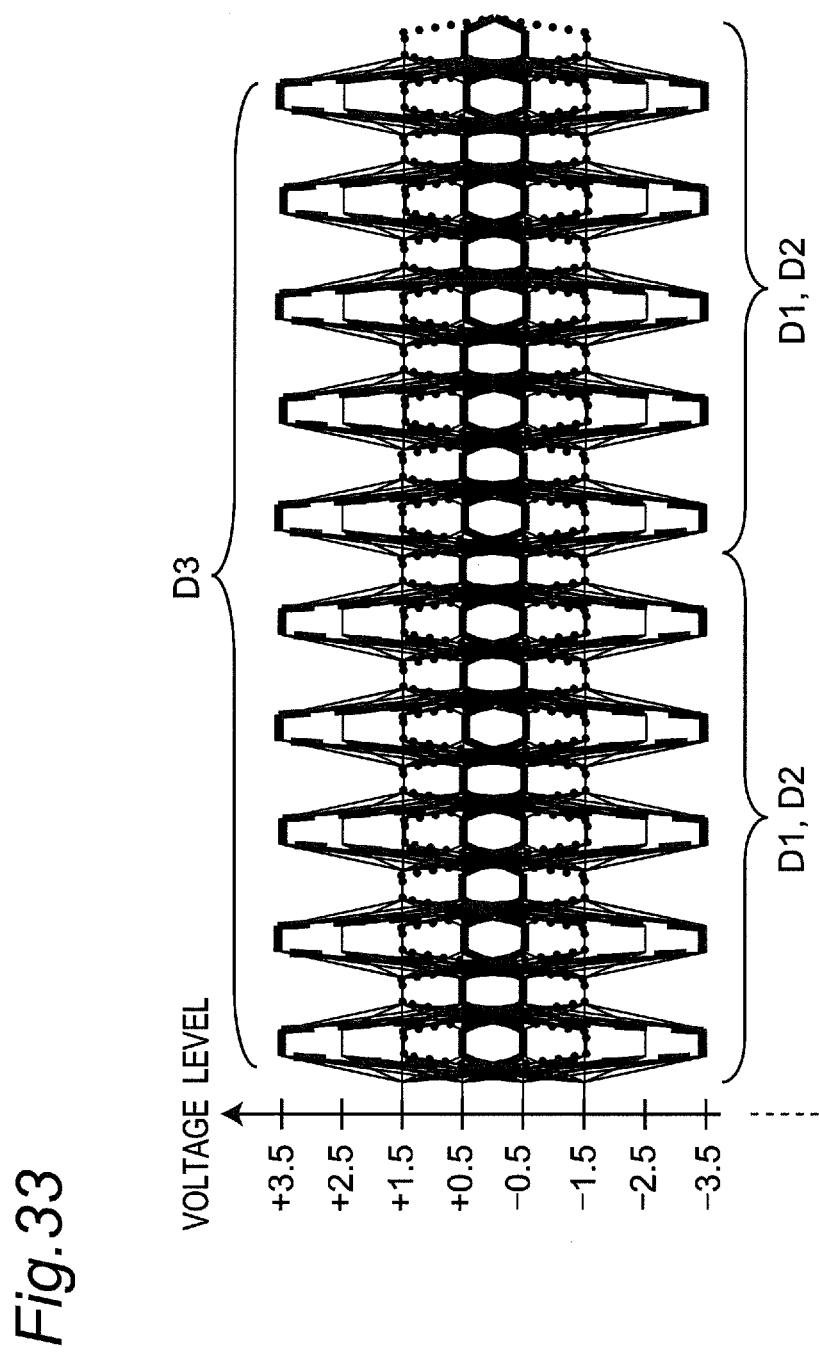
FIG. 33 is a waveform diagram showing a multilevel data signal transmitted in the multilevel signal transmission system of FIG. 29, under the conditions of FIGS. 7, 15, and 31.

Next, as another exemplary operation of the multilevel signal transmission system of FIG. 29, the case in which the voltage levels of the multilevel data signal are indicated in N=3 is explained with reference to FIGS. 32 and 33.

It is assumed that in the data processing circuit 101D of the multilevel signal the transmitting apparatus 100D of FIG. 29 uses the same bit transition rule as that of FIG. 15. It is assumed that the multilevel driver circuit 102 of the multilevel signal transmitting apparatus 100D of FIG. 29 generates the same voltage levels as those of FIG. 7. FIG. 32 is a table showing a second examples of a bit string generated by the data processing circuit 101D of the multilevel signal transmitting apparatus 100D of FIG. 29. FIG. 33 is a waveform diagram showing a multilevel data signal transmitted in the multilevel signal transmission system of FIG. 29, under the conditions of FIGS. 7, 15, and 31. D1, D2, and D3 denote data of the respective bit strings divided by the data preprocessing circuit 105. The bit strings of the data D1, D2, and D3 (including bits b1, b2, and b3, respectively) are encoded using the 8B/10B code with guaranteed DC balance, respectively. The data processing circuit 101D decreases the rate of the bit string of the data D3, than the rate of the bit strings of the data D1 and D2, by one half, as shown in FIG. 32.

According to the multilevel signal transmission system of FIG. 29, it is possible to prevent overshoot and undershoot, which may cause signal distortion, by reducing an amount of transition of the voltage level. In addition, according to the multilevel signal transmission system of FIG. 29, since the encoding method with guaranteed DC balance is used, the multilevel signal transmission system is not affected by a difference between the threshold voltages used by the transmitting apparatus and the threshold voltages used by the receiving apparatus, and by a difference between the ground voltage of the transmitting apparatus and the ground voltage of the receiving apparatus, and in addition, it is possible to accurately follow variations in the voltage levels arose from a temperature change, a device variation, attenuation in a transmission line, etc. Therefore, it is possible to accurately determine the plurality of voltage levels of the multilevel data signal, and surely transmit the multilevel data signal.

Sixth Embodiment

Figure 34:
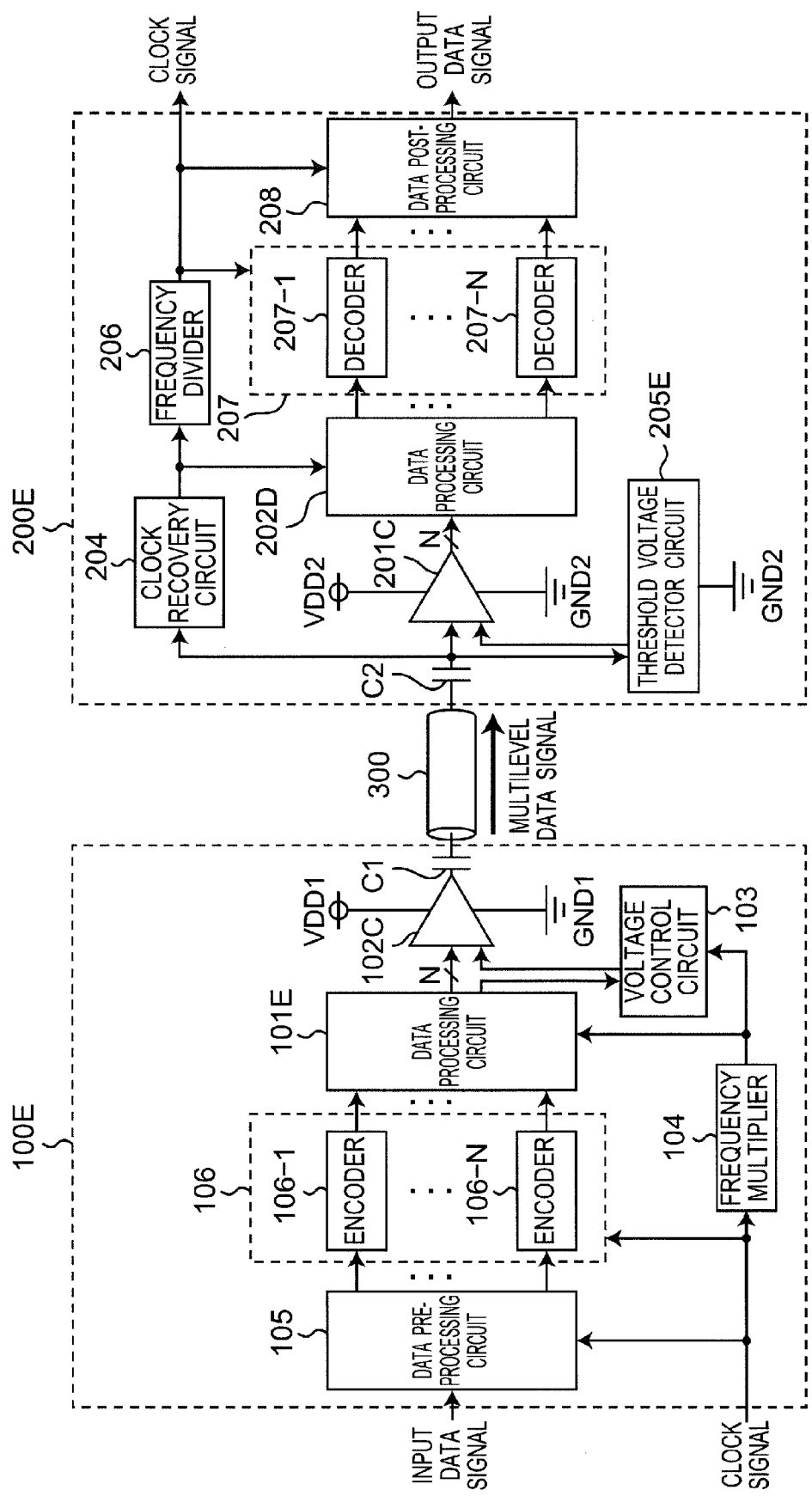
FIG. 34 is a block diagram showing a configuration of a multilevel signal transmission system according to a sixth embodiment.

FIG. 34 is a block diagram showing a configuration of a multilevel signal transmission system according to a sixth embodiment. A multilevel signal transmitting apparatus 100E of FIG. 34 is configured in a manner similar to that of FIG. 29, and further provided with a capacitor C1 connecting an output terminal of the multilevel driver circuit 102C to the transmission line 300. A multilevel signal receiving apparatus 200E of FIG. 34 is configured in a manner similar to that of FIG. 29, and further provided with a capacitor C2 connecting an input terminal of the multilevel receiver circuit 201C to the transmission line 300. Through the capacitors C1 and C2, the multilevel driver circuit 102C and the multilevel receiver circuits 201C are connected to the transmission line 300 by AC coupling. According to the multilevel signal transmission system of FIG. 34, the threshold voltage detector circuit 205E may use the voltage level of the ground GND2 of the multilevel signal receiving apparatus 200E, instead of the average of the voltage levels of the received multilevel data signal.

The capacitors C1 and C2 may be provided at least one of the multilevel signal transmitting apparatus 100E and the multilevel signal receiving apparatus 200E. The capacitors C1 and C2 may be provided to not only the multilevel signal transmission system of FIG. 29, but also the multilevel signal transmission system of FIG. 1, 10, 11, or 18.

Thus, according to the multilevel signal transmission system of FIG. 34, since the center level can be floated, the stable voltage levels of the grounds GND1 and GND2 can be used as the center level, it is possible to accurately and easily determine the center level (0V).

Seventh Embodiment

Figure 35:
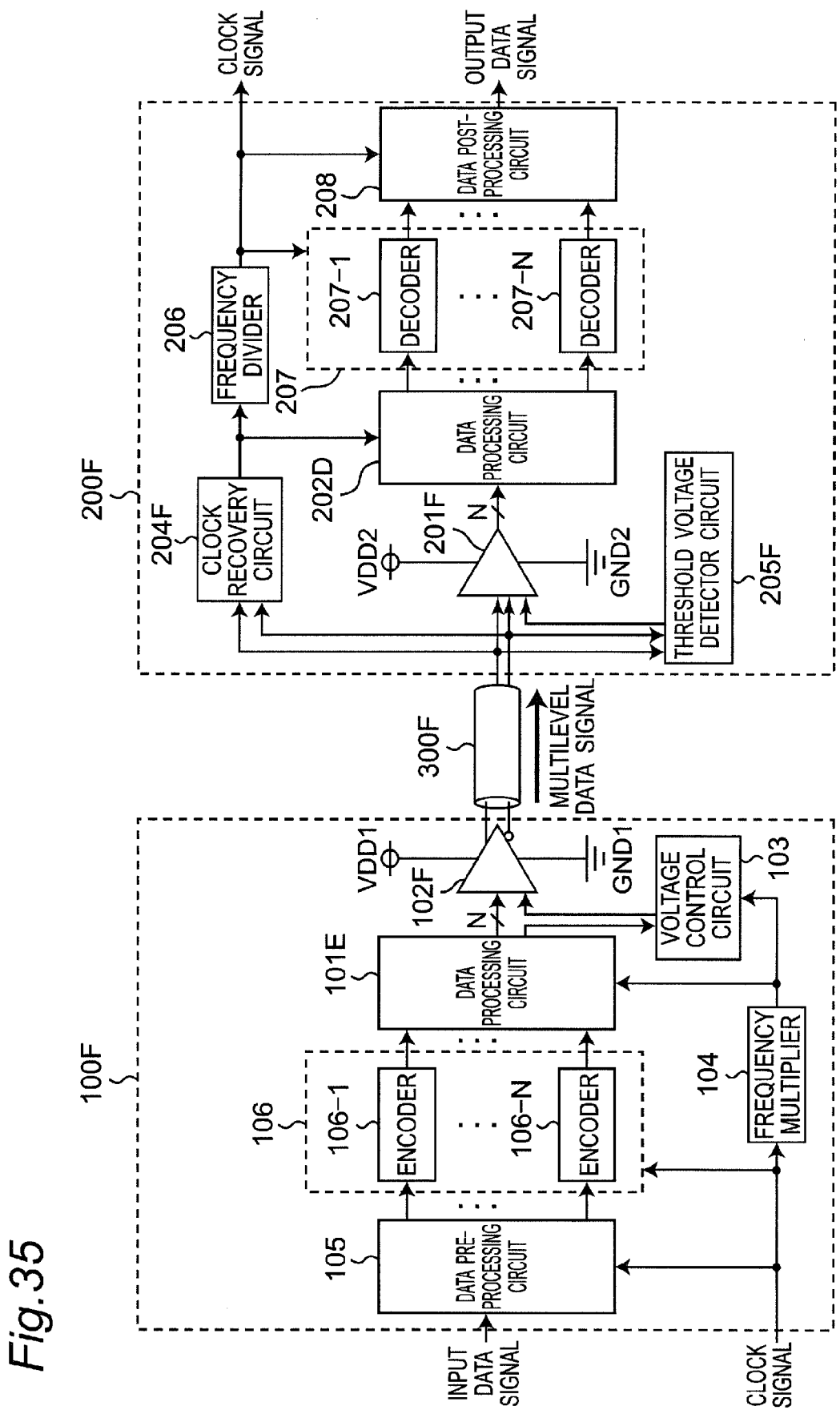
FIG. 35 is a block diagram showing a configuration of a multilevel signal transmission system according to a seventh embodiment.

FIG. 35 is a block diagram showing a configuration of a multilevel signal transmission system according to a seventh embodiment. A multilevel signal transmitting apparatus 100F of FIG. 35 is provided with a multilevel driver circuit 102F as a differential driver circuit, instead of the single-end multilevel driver circuit 102C of FIG. 29. A multilevel signal receiving apparatus 200F of FIG. 35 is provided with a multilevel receiver circuit 201F as 1 differential receiver circuit, instead of the single-end multilevel receiver circuit 202C of FIG. 29. Further, a transmission line 301F as a differential transmission line is provided, instead of the transmission line 300 of FIG. 29. The multilevel signal transmitting apparatus 100F transmits a multilevel data signal as a differential signal, to the multilevel signal receiving apparatus 200F through the transmission line 300F. A threshold voltage detector circuit 205F generates threshold voltages from the received multilevel data signal as the differential signal. According to the multilevel signal transmission system of FIG. 35, the threshold voltage detector circuit 205F can generate a reference voltage level from the received multilevel data signal as the differential signal using the difference principle, instead of detecting the average of the voltage levels of the received multilevel data signal.

The multilevel receiver circuit 201F as the differential driver circuit, and the multilevel driver circuit 102F as the differential receiver circuit may be provided to not only the multilevel signal transmission system of FIG. 29, but also the multilevel signal transmission system of FIG. 1, 10, 11, 18, or 34.

Thus, according to the multilevel signal transmission system of FIG. 35, it is possible to achieve improved receiving sensitivity, higher speed, reduced noise, and improved noise resistance, and the reference voltage level is equal to the voltage levels of the grounds GND1 and GND2. Therefore, it is possible to accurately and easily determine the center level (0V).

As described above, the multilevel signal transmitting apparatus, the multilevel signal receiving apparatus, the multilevel signal transmission system, and the multilevel signal transmission method of the aspects of the present disclosure are configured as follows.

According to a multilevel signal transmitting apparatus according to a first aspect, a multilevel signal transmitting apparatus for generating a multilevel data signal from an original data signal is provided. The multilevel data signal has an even number of voltage levels equal to or more than four. The multilevel signal transmitting apparatus is provided with: a data processing circuit configured to determine the voltage level indicative of the original data signal, in each of unit time intervals, and a driver circuit configured to generate the multilevel data signal including a plurality of unit time intervals, each unit time interval having the determined voltage level. The data processing circuit is configured to: assign a predetermined even number of voltage levels to each of the unit time intervals, assign a smaller number of voltage levels than a maximum number of voltage levels, to a unit time interval next to a unit time interval to which the maximum number of voltage levels are assigned, and determine one of the assigned voltage levels, as the voltage level indicative of the original data signal, in each of the unit time intervals. The driver circuit is configured to generate the multilevel data signal, such that a maximum of absolute values of the voltage levels assigned to the unit time interval, to which the smaller number of voltage levels than the maximum number of voltage levels are assigned, is smaller than a maximum of absolute values of the voltage levels assigned to the unit time interval, to which the maximum number of voltage levels are assigned.

According to a multilevel signal transmitting apparatus according to a second aspect, the multilevel signal transmitting apparatus according to the first aspect is further configured as follows. The data processing circuit is configured to assign different even numbers of voltage levels to any two consecutive unit time intervals, respectively.

According to a multilevel signal transmitting apparatus according to a third aspect, the multilevel signal transmitting apparatus according to the first or second aspect is further configured as follows. The multilevel signal transmitting apparatus is provided with a voltage control circuit configured to controls the voltage level of the multilevel data signal generated by the driver circuit, such that between at least a pair of adjacent voltage levels of the voltage levels assigned to one of any two consecutive unit time intervals, one of the voltage levels assigned to the other of the two consecutive unit time intervals is set.

According to a multilevel signal transmitting apparatus according to a fourth aspect, the multilevel signal transmitting apparatus according to one of the first to third aspects is further configured as follows. The data processing circuit is configured to assign a predetermined number of voltage levels to each of the unit time intervals, the predetermined number being a power of two.

According to a multilevel signal transmitting apparatus according to a fifth aspect, the multilevel signal transmitting apparatus according to the fourth aspect is further configured as follows. The data processing circuit is configured to: divide the original data signal into a number Nmax of bit strings, where $2^{Nmax}$ denotes a maximum numbers of the voltage levels, encode each of the bit strings using an encoding method with guaranteed DC balance, decrease a rate of at least one of the bit strings to be encoded, lower than a rate of another bit string, and determine one of the number $2^{Nmax}$ of voltage levels, as the voltage level indicative of the original data signal, based on a group consisting of respective bits included in the respective bit strings, in each of the unit time intervals.

According to a multilevel signal transmitting apparatus according to a sixth aspect, the multilevel signal transmitting apparatus according to the fifth aspect is further configured as follows. The encoding method uses a 8B/10B code.

According to a multilevel signal transmitting apparatus according to a seventh aspect, the multilevel signal transmitting apparatus according to one of the first to sixth aspects is further configured as follows. An output terminal of the driver circuit is connected to a transmission lines by AC coupling.

According to a multilevel signal transmitting apparatus according to an eighth aspect, the multilevel signal transmitting apparatus according to one of the first to seventh aspects is further configured as follows. The driver circuit is a differential driver circuit.

According to a multilevel signal receiving apparatus according to a ninth aspects, a multilevel signal receiving apparatus for receiving a multilevel data signal having an even number of voltage levels equal to or more than four is provided. In each of unit time intervals, the multilevel data signal is assigned with a predetermined even number of voltage levels. A smaller number of voltage levels than a maximum number of voltage levels are assigned to a unit time interval next to a unit time interval to which the maximum number of voltage levels are assigned. The multilevel data signal has one of the assigned voltage levels in each of the unit time intervals. A maximum of absolute values of the voltage levels assigned to the unit time interval, to which the smaller number of voltage levels than the maximum number of voltage levels are assigned, is smaller than a maximum of absolute values of the voltage levels assigned to the unit time interval, to which the maximum number of voltage levels are assigned. The multilevel signal receiving apparatus is further provided with: a receiver circuit configured to detect the voltage level of the multilevel data signal in each of the unit time intervals, and a data processing circuit configured to reproduce an original data signal of the multilevel data signal, based on the assigned voltage levels and the detected voltage level, in each of the unit time interval.

According to a multilevel signal receiving apparatus according to a tenth aspect, the multilevel signal receiving apparatus according to the ninth aspects is further configured as follows. Different even numbers of voltage levels are assigned to any two consecutive unit time intervals of the multilevel data signal, respectively. The multilevel signal receiving apparatus is further provided with a clock recovery circuit configured to recover a clock signal based on variations of the voltage level over a plurality of unit time intervals of the multilevel data signal.

According to a multilevel signal receiving apparatus according to an eleventh aspect, the multilevel signal receiving apparatus according to the ninth or tenth aspects is further configured as follows. Between at least a pair of adjacent voltage levels of the voltage levels assigned to one of any two consecutive unit time intervals of the multilevel data signal, one of the voltage levels assigned to the other of the two consecutive unit time intervals is set. The multilevel signal receiving apparatus is further provided with a threshold voltage detector circuit configured to detect and store the voltage levels assigned to one of any two consecutive unit time intervals of the multilevel data signal, the detected and stored voltage levels being to be used as threshold voltages to determine the voltage level assigned to the other of the two consecutive unit time intervals. The receiver circuit is configured to determine, based on the threshold voltages, which of the assigned voltage levels the multilevel data signal has.

According to a multilevel signal receiving apparatus according to a twelfth aspect, the multilevel signal receiving apparatus according to one of the ninth to eleventh aspects is further configured as follows. In each of the unit time intervals, the multilevel data signal is assigned with a predetermined number of voltage levels, the predetermined number being a power of two.

According to a multilevel signal receiving apparatus according to a thirteenth aspect, the multilevel signal receiving apparatus according to the twelfth aspects is further configured as follows. The data processing circuit is configured to: divide the multilevel data signal into a number Nmax of bits in each of the unit time intervals, where $2^{Nmax}$ denotes a maximum numbers of the voltage levels. The data processing circuit is configured to: generate the number Nmax of bit strings, each of the bit strings including one of the number Nmax of divided bits, each of the bit strings being encoded using an encoding method with guaranteed DC balance, and a rate of at least one of the bit strings to be encoded being lower than a rate of another bit string. The data processing circuit is configured to: decode each of the bit strings using an inverse method of the encoding method, and combine the decoded bit strings to reproduce the original data signal.

According to a multilevel signal receiving apparatus according to a fourteenth aspect, the multilevel signal receiving apparatus according to the thirteenth aspects is further configured as follows.

The encoding method uses a 8B/10B code.

According to a multilevel signal receiving apparatus according to a fifteenth aspect, the multilevel signal receiving apparatus according to one of the ninth to fourteenth aspects is further configured as follows. An input terminal of the receiver circuit is connected to a transmission lines by AC coupling.

According to a multilevel signal receiving apparatus according to a sixteenth aspect, the multilevel signal receiving apparatus according to one of the ninth to fifteenth aspects is further configured as follows. The receiver circuit is a differential receiver circuit.

According to a multilevel signal transmission system according to a seventeenth aspect, the multilevel signal transmission system is provided with the multilevel signal transmitting apparatus according to the first aspect, and the multilevel signal receiving apparatus according to the ninth aspect. The multilevel signal transmitting apparatus and the multilevel signal receiving apparatus are connected through the transmission line that transmits the multilevel data signal.

According to a multilevel signal transmission system according to an eighteenth aspect, the multilevel signal transmission system according to the seventeenth aspect is further configured as follows. The data processing circuit of the multilevel signal transmitting apparatus is configured to assign different even numbers of voltage levels to any two consecutive unit time intervals, respectively. The multilevel signal receiving apparatus is further provided with a clock recovery circuit configured to recover a clock signal based on variations of the voltage level over a plurality of unit time intervals of the multilevel data signal.

According to a multilevel signal transmission system according to a nineteenth aspect, the multilevel signal transmission system according to the seventeenth or eighteenth aspect is further configured as follows. The multilevel signal transmitting apparatus is further provided with a voltage control circuit configured to controls the voltage level of the multilevel data signal generated by the driver circuit, such that between at least a pair of adjacent voltage levels of the voltage levels assigned to one of any two consecutive unit time intervals, one of the voltage levels assigned to the other of the two consecutive unit time intervals is set. The multilevel signal receiving apparatus is further provide with a threshold voltage detector circuit configured to detect and store the voltage levels assigned to one of any two consecutive unit time intervals of the multilevel data signal, the detected and stored voltage levels being to be used as threshold voltages to determine the voltage level assigned to the other of the two consecutive unit time intervals. The receiver circuit is configured to determine, based on the threshold voltages, which of the assigned voltage levels the multilevel data signal has.

According to a multilevel signal transmission system according to a twentieth aspect, the multilevel signal transmission system according to one of the seventeenth to nineteenth aspects is further configured as follows. The data processing circuit of the multilevel signal transmitting apparatus is configured to assign a predetermined number of voltage levels to each of the unit time intervals, the predetermined number being a power of two.

According to a multilevel signal transmission system according to a twenty-first aspect, the multilevel signal transmission system according to the twentieth aspect is further configured as follows. The data processing circuit of the multilevel signal transmitting apparatus is configured to: divide the original data signal into a number Nmax of bit strings, where $2^{Nmax}$ denotes a maximum numbers of the voltage levels, encode each of the bit strings using an encoding method with guaranteed DC balance, decrease a rate of at least one of the bit strings to be encoded, lower than a rate of another bit string, and determine one of the number $2^{Nmax}$ of voltage levels, as the voltage level indicative of the original data signal, based on a group consisting of respective bits included in the respective bit strings, in each of the unit time intervals. The data processing circuit of the multilevel signal receiving apparatus is configured to: divide the multilevel data signal into a number Nmax of bits in each of the unit time intervals, generate the number Nmax of bit strings, each of the bit strings including one of the number Nmax of divided bits, decode each of the bit strings using an inverse method of the encoding method, and combine the decoded bit strings to reproduce the original data signal.

According to a multilevel signal transmission system according to a twenty-second aspect, the multilevel signal transmission system according to the twenty-first aspect is further configured as follows. The encoding method uses a 8B/10B code.

According to a multilevel signal transmission system according to a twenty-third aspect, the multilevel signal transmission system according to one of the seventeenth to twenty-second aspects is further configured as follows. An output terminal of the driver circuit is connected to the transmission lines by AC coupling, and an input terminal of the receiver circuit is connected to a transmission lines by AC coupling.

According to a multilevel signal transmission system according to a twenty-fourth aspect, the multilevel signal transmission system according to one of the seventeenth to twenty-third aspects is further configured as follows. The driver circuit is a differential driver circuit, and the receiver circuit is a differential receiver circuit.

According to a multilevel signal transmission method according to a twenty-fifth aspect, a multilevel signal transmission method for transmitting a multilevel data signal from a multilevel signal transmitting apparatus to a multilevel signal receiving apparatus is provided. The multilevel data signal has an even number of voltage levels equal to or more than four. The multilevel signal transmission method includes, by the multilevel signal transmitting apparatus, determining one voltage level from an original data signal in each of unit time intervals, the one voltage level being indicative of the original data signal, and generating the multilevel data signal including a plurality of unit time intervals, each unit time interval having the determined voltage level. The step to determining includes: assigning a predetermined even number of voltage levels to each of the unit time intervals, assign a smaller number of voltage levels than a maximum number of voltage levels, to a unit time interval next to a unit time interval to which the maximum number of voltage levels are assigned, and determining one of the assigned voltage levels, as the voltage level indicative of the original data signal, in each of the unit time intervals. The step of generating includes generating the multilevel data signal, such that a maximum of absolute values of the voltage levels assigned to the unit time interval, to which the smaller number of voltage levels than the maximum number of voltage levels are assigned, is smaller than a maximum of absolute values of the voltage levels assigned to the unit time interval, to which the maximum number of voltage levels are assigned. The multilevel signal transmission method includes, by the multilevel signal receiving apparatus, detecting the voltage level of the multilevel data signal in each of the unit time intervals, and reproducing an original data signal of the multilevel data signal, based on the assigned voltage levels and the detected voltage level, in each of the unit time interval.

According to the multilevel signal transmitting apparatus, the multilevel signal receiving apparatus, the multilevel signal transmission system, and the multilevel signal transmission method of the embodiments of the present disclosure, it is possible to prevent overshoot and undershoot, which may cause signal distortion, by reducing an amount of transition of the voltage level. The multilevel signal transmitting apparatus, the multilevel signal receiving apparatus, the multilevel signal transmission system, and the multilevel signal transmission method of the embodiments of the present disclosure can correctly determine the voltage level of the multilevel data signal, and surely transmit the multilevel data signal.

According to the multilevel signal transmitting apparatus, the multilevel signal receiving apparatus, the multilevel signal transmission system, and the multilevel signal transmission method of the embodiments of the present disclosure, it is possible to easily and surely achieve recovery of the clock signal by changing the number of the assigned voltage levels for every unit time interval.

According to the multilevel signal transmitting apparatus, the multilevel signal receiving apparatus, the multilevel signal transmission system, and the multilevel signal transmission method of the embodiments of the present disclosure, the threshold voltages are transmitted from the multilevel signal transmitting apparatus to the multilevel signal receiving apparatus using the multilevel data signal itself. Thus, the multilevel signal transmission system is not affected by a difference between the threshold voltages used by the transmitting apparatus and the threshold voltages used by the receiving apparatus, and by a difference between the ground voltage of the transmitting apparatus and the ground voltage of the receiving apparatus, and in addition, it is possible to accurately follow variations in the voltage levels arose from a temperature change, a device variation, attenuation in a transmission line, etc.

According to the multilevel signal transmitting apparatus, the multilevel signal receiving apparatus, the multilevel signal transmission system, and the multilevel signal transmission method of the embodiments of the present disclosure, A predetermined number of voltage levels are assigned to each of the unit time intervals, the predetermined number being a power of two. Thus, it is possible to process the original data signal, bit by bit, according to a predetermined transition rule.

According to the multilevel signal transmitting apparatus, the multilevel signal receiving apparatus, the multilevel signal transmission system, and the multilevel signal transmission method of the embodiments of the present disclosure, it is possible to transmit using the encoding method with guaranteed DC balance.

According to the multilevel signal transmitting apparatus, the multilevel signal receiving apparatus, the multilevel signal transmission system, and the multilevel signal transmission method of the embodiments of the present disclosure, since a center level of the plurality of voltage levels can be floated by using AC coupling, the stable ground voltage level can be used as the center level, it is possible to accurately and easily determine the center level (0V).

According to the multilevel signal transmitting apparatus, the multilevel signal receiving apparatus, the multilevel signal transmission system, and the multilevel signal transmission method of the embodiments of the present disclosure, since the differential signals are transmitted, it is possible to achieve improved receiving sensitivity, higher speed, reduced noise, and improved noise resistance, and the center level is equal to the ground voltage level. Therefore, it is possible to accurately and easily determine the voltage levels.

The multilevel signal transmitting apparatus, the multilevel signal receiving apparatus, the multilevel signal transmission system, and the multilevel signal transmission method of the embodiments of the present disclosure can prevent overshoot and undershoot, which may cause signal distortion, by reducing an amount of transition of the voltage level. Therefore, it is applicable to, e.g., high-speed data transmission, and to high-speed optical communications with a large overshoot due to relaxation oscillation etc.

The invention claimed is:

1. A multilevel signal transmitting apparatus for generating a multilevel data signal from an original data signal, the multilevel data signal having an even number of voltage levels equal to or more than four,
wherein the multilevel signal transmitting apparatus comprises:
a data processing circuit configured to determine one of the voltage levels, the determined voltage level being indicative of the original data signal, in each of a plurality of unit time intervals; and
a driver circuit configured to generate the multilevel data signal including the unit time intervals, each of the unit time intervals having the corresponding determined voltage level,
wherein the data processing circuit is configured to:
assign a predetermined even number of voltage levels to each of the unit time intervals, such that the unit time intervals include (i) first unit time intervals, each of the first unit time intervals being assigned a maximum number of voltage levels and (ii) second unit time intervals, each of the second unit time intervals being assigned a number of voltage levels less than the maximum number of voltage levels, and such that each of the first unit time intervals is immediately followed by one of the second unit time intervals; and
determine one of the assigned voltage levels, as the voltage level indicative of the original data signal, in each of the unit time intervals, and
wherein the driver circuit is configured to generate the multilevel data signal, such that with respect to a predetermined voltage level, a maximum of amplitude of the voltage levels assigned to each of the second unit time intervals is smaller than a maximum amplitude of the voltage levels assigned to each of the first unit time intervals.

2. The multilevel signal transmitting apparatus according to claim 1,
wherein the data processing circuit is configured to assign different even numbers of voltage levels to any two consecutive unit time intervals, respectively.

3. The multilevel signal transmitting apparatus according to claim 1, further comprises a voltage control circuit configured to control the voltage level of the multilevel data signal generated by the driver circuit, such that between at least a pair of adjacent voltage levels of the voltage levels assigned to one of any two consecutive unit time intervals, one of the voltage levels assigned to the other of the two consecutive unit time intervals is set.

4. The multilevel signal transmitting apparatus according to claim 1,
wherein the data processing circuit is configured to assign a predetermined number of voltage levels to each of the unit time intervals, the predetermined number being a power of two.

5. The multilevel signal transmitting apparatus according to claim 4,
wherein the data processing circuit is configured to:
divide the original data signal into a number Nmax of bit strings, where $2^{Nmax}$ denotes a maximum numbers of the voltage levels;
encode each of the bit strings using an encoding method with guaranteed DC balance;
decrease a rate of at least one of the bit strings to be encoded, lower than a rate of another bit string; and
determine one of the number $2^{Nmax}$ of voltage levels, as the voltage level indicative of the original data signal, based on a group consisting of respective bits included in the respective bit strings, in each of the unit time intervals.

6. The multilevel signal transmitting apparatus according to claim 5,
wherein the encoding method uses a 8B/10B code.

7. The multilevel signal transmitting apparatus according to claim 1,
wherein an output terminal of the driver circuit is connected to a transmission lines by AC coupling.

8. The multilevel signal transmitting apparatus according to claim 1,
wherein the driver circuit is a differential driver circuit.

9. A multilevel signal receiving apparatus for receiving a multilevel data signal having an even number of voltage levels equal to or more than four,
wherein in each of a plurality of unit time intervals, the multilevel data signal is assigned with a predetermined even number of voltage levels, such that the unit time intervals include (i) first unit time intervals, each of the first unit time intervals being assigned a maximum number of voltage levels and (ii) second unit time intervals, each of the second unit time intervals being assigned a number of voltage levels less than the maximum number of voltage levels, and such that each of the first unit time intervals is immediately followed by one of the second unit time intervals,
wherein the multilevel data signal has one of the assigned voltage levels in each of the unit time intervals, wherein with respect to a predetermined reference voltage level, a maximum amplitude of the voltage levels assigned to each of the second unit time intervals is smaller than a maximum amplitude of the voltage levels assigned to each of the first unit time intervals, and wherein the multilevel signal receiving apparatus comprises:

a receiver circuit configured to detect the voltage level of the multilevel data signal in each of the unit time intervals; and a data processing circuit configured to reproduce an original data signal of the multilevel data signal, based on the assigned voltage levels and the detected voltage level, in each of the unit time interval.

10. The multilevel signal receiving apparatus according to claim 9, wherein different even numbers of voltage levels are assigned to any two consecutive unit time intervals of the multilevel data signal, respectively, and wherein the multilevel signal receiving apparatus further comprising a clock recovery circuit configured to recover a clock signal based on variations of the voltage level over a plurality of unit time intervals of the multilevel data signal.

11. The multilevel signal receiving apparatus according to claim 9, wherein between at least a pair of adjacent voltage levels of the voltage levels assigned to one of any two consecutive unit time intervals of the multilevel data signal, one of the voltage levels assigned to the other of the two consecutive unit time intervals is set, wherein the multilevel signal receiving apparatus further comprises a threshold voltage detector circuit configured to detect and store the voltage levels assigned to one of any two consecutive unit time intervals of the multilevel data signal, the detected and stored voltage levels being to be used as threshold voltages to determine the voltage level assigned to the other of the two consecutive unit time intervals, and wherein the receiver circuit is configured to determine, based on the threshold voltages, which of the assigned voltage levels the multilevel data signal has.

12. The multilevel signal receiving apparatus according to claim 9, wherein in each of the unit time intervals, the multilevel data signal is assigned with a predetermined number of voltage levels, the predetermined number being a power of two.

13. The multilevel signal receiving apparatus according to claim 12, wherein the data processing circuit is configured to:

divide the multilevel data signal into a number Nmax of bits in each of the unit time intervals, where $2^{Nmax}$ denotes a maximum numbers of the voltage level;

generate the number Nmax of bit strings, each of the bit strings including one of the number Nmax of divided bits, each of the bit strings being encoded using an encoding method with guaranteed DC balance, and a rate of at least one of the bit strings to be encoded being lower than a rate of another bit string;

decode each of the bit strings using the inverse method of the encoding method; and combine the decoded bit strings to reproduce the original data signal.

14. The multilevel signal receiving apparatus according to claim 13, wherein the encoding method uses a 8B/10B code.

15. The multilevel signal receiving apparatus according to claim 9, wherein an input terminal of the receiver circuit is connected to a transmission lines by AC coupling.

16. The multilevel signal receiving apparatus according to claim 9, wherein the receiver circuit is a differential receiver circuit.

17. A multilevel signal transmission system comprising an multilevel signal transmitting and an multilevel signal receiving apparatus, wherein the multilevel signal transmitting apparatus is configured to generate a multilevel data signal from an original data signal, the multilevel data signal having an even number of voltage levels equal to or more than four, wherein the multilevel signal transmitting apparatus comprises:

a data processing circuit configured to determine one of voltage levels, the determined voltage level being indicative of the original data signal, in each of unit time intervals; and a driver circuit configured to generate the multilevel data signal including a the unit time intervals, each of the unit time intervals having the corresponding determined voltage level, wherein the data processing circuit of the multilevel signal transmitting apparatus is configured to:

assign a predetermined even number of voltage levels to each of the unit time intervals, such that the unit time intervals include (i) first unit time intervals, each of the first unit time intervals being assigned a maximum number of voltage levels and (ii) second unit time intervals, each of the second unit time intervals being assigned a number of voltage levels less than the maximum number of voltage levels, and such that each of the first unit time intervals is immediately followed by one of the second unit time intervals; and determine one of the assigned voltage levels, as the voltage level indicative of the original data signal, in each of the unit time intervals, wherein the driver circuit is configured to generate the multilevel data signal, such that with respect to a predetermined reference voltage level, a maximum amplitude of the voltage levels assigned to each of the second unit time intervals is smaller than a maximum amplitude of the voltage levels assigned to each of the first unit time intervals, wherein the multilevel signal receiving apparatus is configured to receive the multilevel data signal, wherein the multilevel signal receiving apparatus comprises:

a receiver circuit configured to detect the voltage level of the multilevel data signal in each of the unit time intervals; and a data processing circuit configured to reproduce an original data signal of the multilevel data signal, based on the assigned voltage levels and the detected voltage level, in each of the unit time interval, and wherein the multilevel signal transmitting apparatus and the multilevel signal receiving apparatus are connected through a transmission line that transmits the multilevel data signal.

18. The multilevel signal transmission system according to claim 17, wherein the data processing circuit of the multilevel signal transmitting apparatus is configured to assign different even numbers of voltage levels to any two consecutive unit time intervals, respectively, and wherein the multilevel signal receiving apparatus further comprising a clock recovery circuit configured to recover a clock signal based on variations of the voltage level over a plurality of unit time intervals of the multilevel data signal.

19. The multilevel signal transmission system according to claim 17,
wherein the multilevel signal transmitting apparatus comprises a voltage control circuit configured to control the voltage level of the multilevel data signal generated by the driver circuit, such that between at least a pair of adjacent voltage levels of the voltage levels assigned to one of any two consecutive unit time intervals, one of the voltage levels assigned to the other of the two consecutive unit time intervals is set,
wherein the multilevel signal receiving apparatus further comprises a threshold voltage detector circuit configured to detect and store the voltage levels assigned to one of any two consecutive unit time intervals of the multilevel data signal, the detected and stored voltage levels being to be used as threshold voltages to determine the voltage level assigned to the other of the two consecutive unit time intervals, and
wherein the receiver circuit is configured to determine, based on the threshold voltages, which of the assigned voltage levels the multilevel data signal has.

20. The multilevel signal transmission system according to claim 17,
wherein the data processing circuit of the multilevel signal transmitting apparatus is configured to assign a predetermined number of voltage levels to each of the unit time intervals, the predetermined number being a power of two.

21. The multilevel signal transmission system according to claim 20,
wherein the data processing circuit of the multilevel signal transmitting apparatus is configured to:
divide the original data signal into a number Nmax of bit strings, where $2^{Nmax}$ denotes a maximum numbers of the voltage levels;
encode each of the bit strings using an encoding method with guaranteed DC balance;
decrease a rate of at least one of the bit strings to be encoded, lower than a rate of another bit string; and
determine one of the number $2^{Nmax}$ of voltage levels, as the voltage level indicative of the original data signal, based on a group consisting of respective bits included in the respective bit strings, in each of the unit time intervals, and
wherein the data processing circuit of the multilevel signal receiving apparatus is configured to:
divide the multilevel data signal into the number Nmax of bits in each of the unit time intervals;
generate the number Nmax of bit strings, each of the bit strings including one of the number Nmax of divided bits;
decode each of the bit strings using an inverse method of the encoding method; and
combine the decoded bit strings to reproduce the original data signal.

22. The multilevel signal transmission system according to claim 21,
wherein the encoding method uses a 8B/10B code.

23. The multilevel signal transmission system according to claim 17,
wherein an output terminal of the driver circuit is connected to the transmission lines by AC coupling, and
wherein an input terminal of the receiver circuit is connected to the transmission lines by AC coupling.

24. The multilevel signal transmission system according to claim 17,
wherein the driver circuit is a differential driver circuit, and
wherein the receiver circuit is a differential receiver circuit.

25. A multilevel signal transmission method for transmitting a multilevel data signal from a multilevel signal transmitting apparatus to a multilevel signal receiving apparatus, the multilevel data signal having an even number of voltage levels equal to or more than four,
wherein the multilevel signal transmission method includes steps of, performed by the multilevel signal transmitting apparatus:
determining one of the voltage levels, the determined voltage level being indicative of the original data signal, in each of a plurality of unit time intervals; and
generating the multilevel data signal including the unit time intervals, each of the unit time intervals having the corresponding determined voltage level,
wherein the step to determining includes:
assigning a predetermined even number of voltage levels to each of the unit time intervals, such that the unit time intervals include (i) first unit time intervals, each of the first unit time intervals being assigned a maximum number of voltage levels and (ii) second unit time intervals, each of the second unit time intervals being assigned a number of voltage levels less than the maximum number of voltage levels, and such that each of the first unit time intervals is immediately followed by one of the second unit time intervals; and
determining one of the assigned voltage levels, as the voltage level indicative of the original data signal, in each of the unit time intervals,
wherein the step of generating includes generating the multilevel data signal, such that with respect to a predetermined reference voltage level, a maximum amplitude of the voltage levels assigned to each of the second unit time intervals is smaller than a maximum amplitude of the voltage levels assigned to each of the first unit time intervals, and
wherein the multilevel signal transmission method includes steps of, performed by multilevel signal receiving apparatus:
detecting the voltage level of the multilevel data signal in each of the unit time intervals; and
reproducing an original data signal of the multilevel data signal, based on the assigned voltage levels and the detected voltage level, in each of the unit time interval.

* * * * *